United States Patent
Jain et al.

(10) Patent No.: US 10,949,907 B1
(45) Date of Patent: Mar. 16, 2021

(54) SYSTEMS AND METHODS FOR DEEP LEARNING MODEL BASED PRODUCT MATCHING USING MULTI MODAL DATA

(71) Applicant: Price Technologies Inc., San Francisco, CA (US)

(72) Inventors: Rahul Jain, San Francisco, CA (US); Steven Douglas Moffitt, Alameda, CA (US)

(73) Assignee: Price Technologies Inc., San Francisco, CA (US)

( * ) Notice: Subject to any disclaimer, the term of this patent is extended or adjusted under 35 U.S.C. 154(b) by 0 days.

(21) Appl. No.: 16/947,977

(22) Filed: Aug. 26, 2020

Related U.S. Application Data

(60) Provisional application No. 62/705,342, filed on Jun. 23, 2020.

(51) Int. Cl.
| | |
|---|---|
| *G06Q 30/00* | (2012.01) |
| *G06Q 30/06* | (2012.01) |
| *G06K 9/62* | (2006.01) |
| *G06N 3/04* | (2006.01) |

(52) U.S. Cl.
CPC ....... *G06Q 30/0627* (2013.01); *G06K 9/6215* (2013.01); *G06K 9/6284* (2013.01); *G06N 3/0454* (2013.01); *G06Q 30/0629* (2013.01); *G06Q 30/0631* (2013.01)

(58) Field of Classification Search
CPC ... G06Q 30/0601–0645; G06K 9/6215; G06K 9/6284; G06N 3/0454
See application file for complete search history.

(56) References Cited

U.S. PATENT DOCUMENTS

| | | | |
|---|---|---|---|
| 9,792,301 B2 | 10/2017 | Rodriguez-Serrano et al. | |
| 10,565,498 B1 * | 2/2020 | Zhiyanov | G06N 7/005 |
| 2014/0095463 A1 | 4/2014 | Pappas | |

(Continued)

OTHER PUBLICATIONS

Fathalla, A., Ahmad, S., Kenli, L., Li, K., & Piccialli, F. (Jul. 24, 2020). Deep end-to-end learning for price prediction of second-hand items. Knowledge and Information Systems, 62(12), 4541-4568. (Year: 2020).*

(Continued)

*Primary Examiner* — Resha Desai
*Assistant Examiner* — Kennedy Gibson-Wynn
(74) *Attorney, Agent, or Firm* — American Patent Agency PC; Daniar Hussain; Xiaomeng Shi

(57) ABSTRACT

Methods and systems for generating a list of products each matching a reference product are disclosed. A user query is first received, and multi-modal attribute data for the reference product are determined, with each data mode being a type of product characterization having a modality selected from a text data class, categorical data, a pre-compared engineered feature, audio, image, and video. Next, a first list of candidate products is determined based on a product match signature, and a second list of candidate products is generated from the first, wherein for at least one given candidate product, a deep learning multi-modal matching model is selected to determine whether a match is found. Lastly, the second list is filtered to remove outliers and to generate the list of matching products. Also disclosed are benefits of the new methods and systems, and alternative embodiments of the implementation.

20 Claims, 20 Drawing Sheets

(56) References Cited

U.S. PATENT DOCUMENTS

| | | | |
|---|---|---|---|
| 2019/0156177 A1* | 5/2019 | Abdallah | G06N 3/006 |
| 2019/0236674 A1* | 8/2019 | Zhao | G06Q 30/0623 |
| 2020/0104897 A1* | 4/2020 | Oh | G06Q 30/0629 |
| 2020/0104900 A1* | 4/2020 | Mohiuddin Khan | G06Q 30/0631 |
| 2020/0160229 A1* | 5/2020 | Atcheson | G06N 5/02 |
| 2020/0250731 A1* | 8/2020 | Soohoo | G06Q 30/0631 |
| 2020/0273083 A1* | 8/2020 | Motwani | G06Q 30/0627 |
| 2020/0311798 A1* | 10/2020 | Forsyth | G06F 16/9577 |

OTHER PUBLICATIONS

More, "Product Matching in eCommerce Using Deep Learning", Sep. 11, 2017, pp. 1-12.

Sanket, "AI-Powered Product Matching: The Key to Competitive Pricing Intelligence in eCommerce", Annotate Image, Aug. 30, 2019, pp. 1-6.

Tautkute et al., "DeepStyle: Multimodal Search Engine for Fashion and Interior Design", IEEE Access, Feb. 2019, pp. 1-14.

Yim et al., "One-Shot Item Search with Multimodal Data", Nov. 2018, pp. 1-6.

\* cited by examiner

100

110

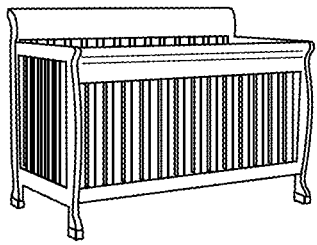

DaVinci 4-in-1 Convertible Crib in Cherry
$ 210.00 shipping included

Designed to grow with your little one, converts into a toddler bed, daybed, and a full-sized bed. Compatible with standard sized mattresses. Free of toxic chemicals, exceeds U.S. safety standards. Made of 100% solid New Zealand pine wood.

120

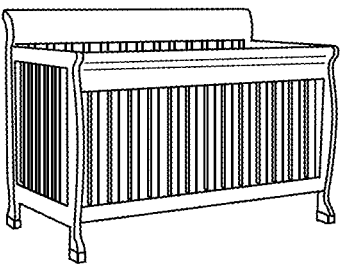

DaVinci Kanali 4-in-1 Convertible Crib
White $189.00.
Make 3 payments of $63.00/mo at 0% APR Built from solid wood, the DaVinci Kalani 4-in-1 Convertible Crib is designed to grow with your child. Timeless design features gently curved lines in a smooth, rich finish that will easily transition from tot to teen.

130

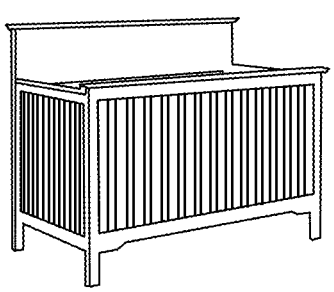

DaVinci Autumn 4-in-1 Convertible Crib
Condition: New
List Price: US $229.00
Our bestselling Autumn 4-in-1 Crib is designed to fit any nursery from traditional to contemporary. Constructed of 100% natural solid New Zealand pine wood. Offers easy conversion to a toddler bed, daybed, and full-sized bed.

140

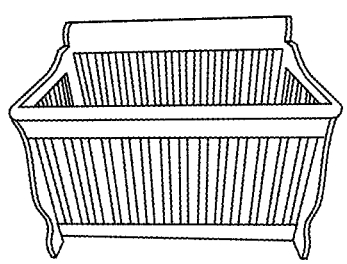

$100
Used 3 in 1 Convertible Crib
by BabyStuff4Sale
Real wood 3 in 1 convertible crib, with mattress and sheets. Originally purchased new. Need additional components to be converted into a full-sized bed. Can be disassembled for transportation if needed. Curbside pickup in Brookline Village.

FIG. 1

| MENU | | Price.com | REGISTER/LOG IN | MY PRICE ALERTS |

Results for "crib"  x Filter Results                1-30 of 56643 Results

| Price | Brand | | Color | |
|---|---|---|---|---|
| ○ All | ☐ Ag Adriano Gol... | ☐ Despkon | ☐ Beige | ☐ Green |
| ○ Under $25 | ☐ Anmaseven | ☐ Dragon Vines | ☐ Black | ☐ Grey |
| ○ $25 To $50 | ☐ Artverse | ☐ Dsc | ☐ Blue | ☐ Ivory |
| ○ $50 To $100 | ☐ Cepere | ☐ Fastasticdeals | ☐ Brown | ☐ Metallic |
| ● $100 To $200 | ☐ Datiansun | ☐ Kufa Sports | ☐ Clear | ☐ Multicolor |
| ○ $200 & Above | ☐ Deluxe Tradition | +See More | ☐ Gold | +See More |

Union 3-in-1 Convertible Crib, Grey — $119.00

DaVinci Kalani 4-in-1 Convertible Crib in ... — $189.00

Crib Cuddler | Classic Edition | Ne... — $129.99

Crib Travel Cots Baby Basket Cradle... — $166.64

Crib Bedding Set - Nordic Cross des... — $185.00

Alessi Happy Eternity Baby Crib, us... — $129.00

Aussie Cot Net Co Baby Crib Safety ... — $126.00

Union 3-in-1 Convertible Crib, — $113.41

Moonlight Slumber Dual Sided Baby C... — $196.99

Official Amazon Exclusive NapYou — $119.99

Graco Benton 4-in-1 Convertible Cri... — $159.99

Colgate Eco Classica III Dual Firmn... — $162.95

FIG. 4A

| | | | | | Recommendation $170.56 |
|---|---|---|---|---|---|

DaVinci Kalani 4-in-1 Convertible Crib in Espresso | Greenguard Gold Certified

~~$189.00~~ You Save $18.44 (10%)

Buy from eBay

Beautifully made and incredibly versatile, our Kalani 4-in-1 Crib features gentle curves and sturdy construction that can be converted for use as a toddler bed, day bed an full-sized bed. Constructed from 100% natural solid New Zealand pine wood, this GREENGUARD Gold Certified crib makes a safe and sleep haven for your little one. Safe, sturdy, an......

Set a Price Drop
Get an alert as soon as it's on sale.

| $136.45 | Set |

Shopping Options

☐ IN-STOCK  ☐ NEW  ☐ USED  ☐ REFURBISHED  ☐ GENERIC
☐ RENTAL  ☐ AUCTION  ☐ NEAR-BY  ☐ OPEN BOX  ☐ LOCAL

| SOLD BY ▼ | PHOTO | COUPONS ▼ | ITEM PRICE ▼ | AVAILABILITY ▼ | SHOP BY CONDITION ▼ |
|---|---|---|---|---|---|
| Amazon | ☐ | 2 Coupons | $189.00 | ○ Out of Stock | Shop New |
| Target | ☐ | 4 Coupons | $189.99 | ○ In-Stock | Shop New |
| Bed Bath and Beyond | ☐ | 2 Coupons | $189.00 | ○ In-Stock | Shop Refurbished |
| Overstock | ☐ | | $253.49 | ○ Out of Stock | Shop New |
| eBay ④ | ☐ | 1 Coupon | $229.00 | ○ In-Stock | Shop Used |
| Houzz | ☐ | | $199.09 | ○ Out of Stock | Shop Generic |
| Jet | ☐ | | $191.40 | ○ In-Stock | Shop New |
| eBay ④ | ☐ | 1 Coupon | $100.00 | ○ In-Stock | Shop Open Box |
| 5miles ⑥ | ☐ | | $80.00 | ○ In-Stock | Shop Local |
| Sam's Club | ☐ | | $129.98 | ○ In-Stock | Shop New |
| Rakuten | ☐ | 5 Coupons | $194.50 | ○ In-Stock | Shop New |
| Burlington | ☐ | | $209.99 | ○ Out of Stock | Shop Near-By |
| QVC | ☐ | | $200.00 | ○ Out of Stock | Shop New |

Amazon Price History  Average $189.00  Volatility 0%

$189.00 60 Day Low

| MENU | | Price.com | | REGISTER/LOG IN | MY PRICE ALERTS |
|---|---|---|---|---|---| pTABLET DELUXE
10.1 inch, Wi-Fi, 5G, 512GB -- Fire Red 10.1 Inch Display, Front and back HD 3D cameras, P10 Lightening Chip, Touch ID Fingerprint Sensor on back panel, 802.11ac Wi-Fi, 5G and LTE cellular data, up to 12 hours of battery, 512GB solid-state drive, expandable with cloud storage and additional SD card, support pVirtual keyboard with front camera

Recommendation
$309.00
$329.99 You Save $20.99 (6%)
[ Buy from eBay ]

Set a Price Drop
Get an alert as soon as it's on sale.
| $247.20 | Set |

Shopping Options

☐ IN-STOCK ☐ NEW ☐ USED ☐ REFURBISHED ☐ GENERIC
☐ RENTAL ☐ AUCTION ☐ NEAR-BY ☐ OPEN BOX ☐ LOCAL

| SOLD BY ▼ | PHOTO | COUPONS ▼ | ITEM PRICE ▼ | AVAILABILITY ▼ | SHOP BY CONDITION ▼ |
|---|---|---|---|---|---|
| Amazon | ☐ | 2 Coupons | $329.99 | ○ Out of Stock | ( Shop New ) |
| eBay | ☐ | 1 Coupon | $547.98 | ○ In-Stock | ( Shop New ) |
| Overstock | ☐ | | $449.99 | ○ Out of Stock | ( Shop New ) |
| Rakuten | ☐ | 2 Coupons | $329.99 | ○ In-Stock | ( Shop New ) |
| Declutter ③ | ☐ | | $139.99 | ○ Out of Stock | ( Shop Used ) |

FIG. 12B

| | |
|---|---|
| | ☑ Is active |
| Advertiser | ACLIENT ⌄ → + |
| Keyword | Baby Stroller |
| Promotion url | https://shop.aclient.com/model/mars-triple-stroller/ |
| SKU | 33133 |
| Title | |
| Image url | |
| Price | |
| Expires in | 365 ⌄ → + × |
| Created on | May 27, 2020, 2:28 a.m. |
| Updated on | May 27, 2020, 2:28 a.m. |
| Expired on | |

SYSTEMS AND METHODS FOR DEEP LEARNING MODEL BASED PRODUCT MATCHING USING MULTI MODAL DATA

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of object matching, and pertain particularly to methods and systems for product matching using deep learning network-based matching models.

BACKGROUND OF THE INVENTION

The statements in this section may serve as a background to help understand the invention and its application and uses, but may not constitute prior art.

Product matching generally refers to a data analysis process to determine whether two given products are identical or are both variations of the same product. Product matching has important applications in ecommerce, for example, in price matching and in product database management: for an individual consumer, price matching across different platforms or retailers can lead to lower prices for a desired product; for a retailer, pricing and discounting strategies inconsistent with competitors may have significant impact on profit.

Matching algorithms have been studied by computer scientists for decades, and recent developments in artificial intelligence have enabled near human-level performance in facial verification and recognition, handwritten signature verification, approximate textual string matching, and in many other application areas. Such matching algorithms often rely on complete, structured data, where missing, incorrect, or non-standard values must be anticipated, normalized, or resolved. By comparison, commercial products are often represented by descriptive data having multiple modes, where matching products from different retail platforms may differ in one or more descriptive attribute data fields. That is, a product can be concurrently associated with textual information (e.g., titles, descriptions, reviews), visual information (e.g., product images and/or videos by the manufacturer or by a past buyer), audio information (e.g. a podcast review of the product), categorical information (e.g., product material, color, or size), and other types or modes of descriptive data. A descriptive data attribute or field available on one retail platform for a given product may not be available on another platform for the same product, and existing matching algorithms often fail to provide meaningful matching results when one or more key attribute fields are missing. Furthermore, existing product matching algorithms often rely heavily on numeric product codes such as UPC and SKU, which may not always be available outside of major vendor platforms.

Therefore, in view of the aforementioned difficulties, there is an unsolved need to develop a high-performance product matching system that fully exploits all available descriptive data when matching commercial products.

It is against this background that various embodiments of the present invention were developed.

BRIEF SUMMARY OF THE INVENTION

Methods, systems, and apparatus are provided for generating a list of matching products, wherein each matching product matches a reference product.

In one aspect, an embodiment of the present invention is a method comprising the steps of receiving a user query for the reference product; determining reference attribute data for the reference product, wherein the reference attribute data is multimodal having at least two data modes, wherein each data mode is a type of characterization of the reference product, and wherein each data mode has a modality selected from the group consisting of a text data class, categorical data, a pre-compared engineered feature, audio data, image data, and video data; determining a first list of candidate products, based on at least one reference product match signature generated from the reference attribute data by a deep learning product signature model; generating a second list of candidate products from the first list of candidate products, wherein for at least one given candidate product in the first list of candidate products, selecting a deep learning multimodal matching model, based on a reference category associated with the reference product and a first attribute data item for the given candidate product, matching the given candidate product to the reference product using the selected deep learning multimodal matching model to generate a match score, wherein the match score is computed based on the reference attribute data for the reference product and attribute data for the given candidate product, and wherein the attribute data for the given candidate product is multimodal having at least two data modes, determining whether the match score meets a given threshold, and in response to determining that the match score meets the given threshold, adding the given candidate product to the second list of candidate products; and generating the list of matching products by filtering the second list of candidate products to remove outlier candidate products.

In some embodiments, the first attribute data item for the given candidate product is selected from the group consisting of product type, vendor, brand, product category, and target consumer group. In some embodiments, the first attribute data item is a product type attribute having a value selected from the group consisting of new, used, refurbished, renewed, open-box, generic, rental, offline sale, local resale, and auction.

In some embodiments, the selection of the deep learning multimodal matching model is further based on a user attribute extracted from the user query. In some embodiments, the user attribute is selected from the group consisting of a location, a gender and an age.

In some embodiments, the user query comprises at least one reference attribute data item for the reference product, the at least one reference attribute data item selected from the group consisting of a search keyword, an image, an audio clip, a video clip, a web address, a barcode, a stock keeping unit (SKU) code, a Universal Product Code (UPC), an International Standard Book Number (ISBN), an Amazon Standard Identification Number (ASIN), an European Article Number (EAN) and a Manufacturer's Part Number (MPN).

In some embodiments, the determining attribute data for the reference product comprises the steps of extracting at least one identifier for the reference product from the user query; determining whether the reference product exists in an internal database by searching the internal database with the at least one identifier for the reference product; in response to determining that the reference product exists in the internal database, retrieving the reference attribute data for the reference product from the internal database; and in response to determining that the reference product does not exist in the internal database, performing a search in at least one external database for the reference product to identify the reference attribute data for the reference product, and adding the reference product to the internal database by adding the reference attribute data to the internal database.

In some embodiments, the text data class is selected from a group consisting of a title text class, a product description text class, a product review text class, a social media post text class, and a ranking label text class.

In some embodiments, the reference attribute data comprises at least a first reference subset of attribute data having a first mode and a second reference subset of attribute data having a second mode different from the first mode, the attribute data for the given candidate product comprises at least a first comparison subset of attribute data having the first mode, and a second comparison subset of attribute data having the second mode, and the matching the given candidate product to the reference product using the selected deep learning multimodal matching model to generate the match score comprises the steps of determining, for the reference product, a first reference signature from the first reference subset of attribute data using a first deep learning neural network (DLN), and a second reference signature from the second reference subset of attribute data using a second DLN; and determining, for the given candidate product, a first comparison signature from the first comparison subset of attribute data using the first DLN, and a second comparison signature from the second comparison subset of attribute data using the second DLN, wherein the match score is computed based on the first reference signature, the second reference signature, the first comparison signature, and the second comparison signature.

In some embodiments, at least one candidate product in the first list of candidate products has a second engineered feature attribute data item that has been pre-compared to the reference product.

In some embodiments, the match score is a matching probability.

In some embodiments, the filtering the second list of candidate products comprises the steps of clustering candidate products in the second list of candidate products based on at least a second attribute data item; determining whether an outlier cluster comprising the outlier candidate products exists; and in response to determining that the outlier cluster exists, removing the outlier candidate products in the outlier cluster from the second list of candidate products. In some embodiments, the second attribute data item is a price attribute.

In some embodiments, the method further comprises the steps of receiving a user selection of one target product in the list of matching products; and providing to the user a link to an online purchase page for the target product.

In some embodiments, the reference product match signature is generated from at least one reference attribute data item selected from the group consisting of a keyword, an image, and a categorical variable associated with the reference product. In some embodiments, the reference product match signature is generated further from the user query.

In another aspect, an embodiment of the present invention is a system comprising one or more processors and one or more non-transitory, computer-readable storage media for storing program code accessible by the one or more processors, the program code when executed by the one or more processors causes the one or more processors to receive a user query for the reference product; determine reference attribute data for the reference product, wherein the reference attribute data is multimodal having at least two data modes, wherein each data mode is a type of characterization of the reference product, and wherein each data mode has a modality selected from the group consisting of a text data class, categorical data, a pre-compared engineered feature, audio data, image data, and video data; determine a first list of candidate products, based on at least one reference product match signature generated from the reference attribute data by a deep learning product signature model; generate a second list of candidate products from the first list of candidate products, wherein for at least one given candidate product in the first list of candidate products, select a deep learning multimodal matching model, based on a reference category associated with the reference product and a first attribute data item for the given candidate product, match the given candidate product to the reference product using the selected deep learning multimodal matching model to generate a match score, wherein the match score is computed based on the reference attribute data for the reference product and attribute data for the given candidate product, and wherein the attribute data for the given candidate product is multimodal having at least two data modes, determine whether the match score meets a given threshold, and in response to determining that the match score meets the given threshold, add the given candidate product to the second list of candidate products; and generate the list of matching products by filtering the second list of candidate products to remove outlier candidate products.

In yet another aspect, an embodiment of the present invention is a non-transitory, computer-readable storage medium storing program code accessible by one or more processors, the program code when executed by the one or more processors cause the one or more processors to: receive a user query for the reference product; determine reference attribute data for the reference product, wherein the reference attribute data is multimodal having at least two data modes, wherein each data mode is a type of characterization of the reference product, and wherein each data mode has a modality selected from the group consisting of a text data class, categorical data, a pre-compared engineered feature, audio data, image data, and video data; determine a first list of candidate products, based on at least one reference product match signature generated from the reference attribute data by a deep learning product signature model; generate a second list of candidate products from the first list of candidate products, wherein for at least one given candidate product in the first list of candidate products, select a deep learning multimodal matching model, based on a reference category associated with the reference product and a first attribute data item for the given candidate product, match the given candidate product to the reference product using the selected deep learning multimodal matching model to generate a match score, wherein the match score is computed based on the reference attribute data for the reference product and attribute data for the given candidate product, and wherein the attribute data for the given candidate product is multimodal having at least two data modes, determine whether the match score meets a given threshold, and in response to determining that the match score meets the given threshold, add the given candidate product to the second list of candidate products; and generate the list of matching products by filtering the second list of candidate products to remove outlier candidate products.

In some embodiments, the first attribute data item for the given candidate product is selected from the group consisting of product type, vendor, brand, product category, and target consumer group.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 1 is a diagram showing an exemplary product matching result using methods and systems implemented according to some embodiments of the present invention;

FIG. 4A is an exemplary screen capture of an interface for receiving a user query for a reference product, according to exemplary embodiments of the present invention;

FIG. 4B is an exemplary screen capture of a list of products that matches a given reference product item, according to exemplary embodiments of the present invention;

FIGS. 12A and 12B are respective illustrative screencaps showing a use case for a product matching system on an ecommerce platform, according to some embodiments of the present invention;

FIG. 14 is an illustrative diagram showing a self-serve advertising entry into the PRICE product matching system, according to some embodiments of the present invention;

DETAILED DESCRIPTION OF THE INVENTION

Figure 2:
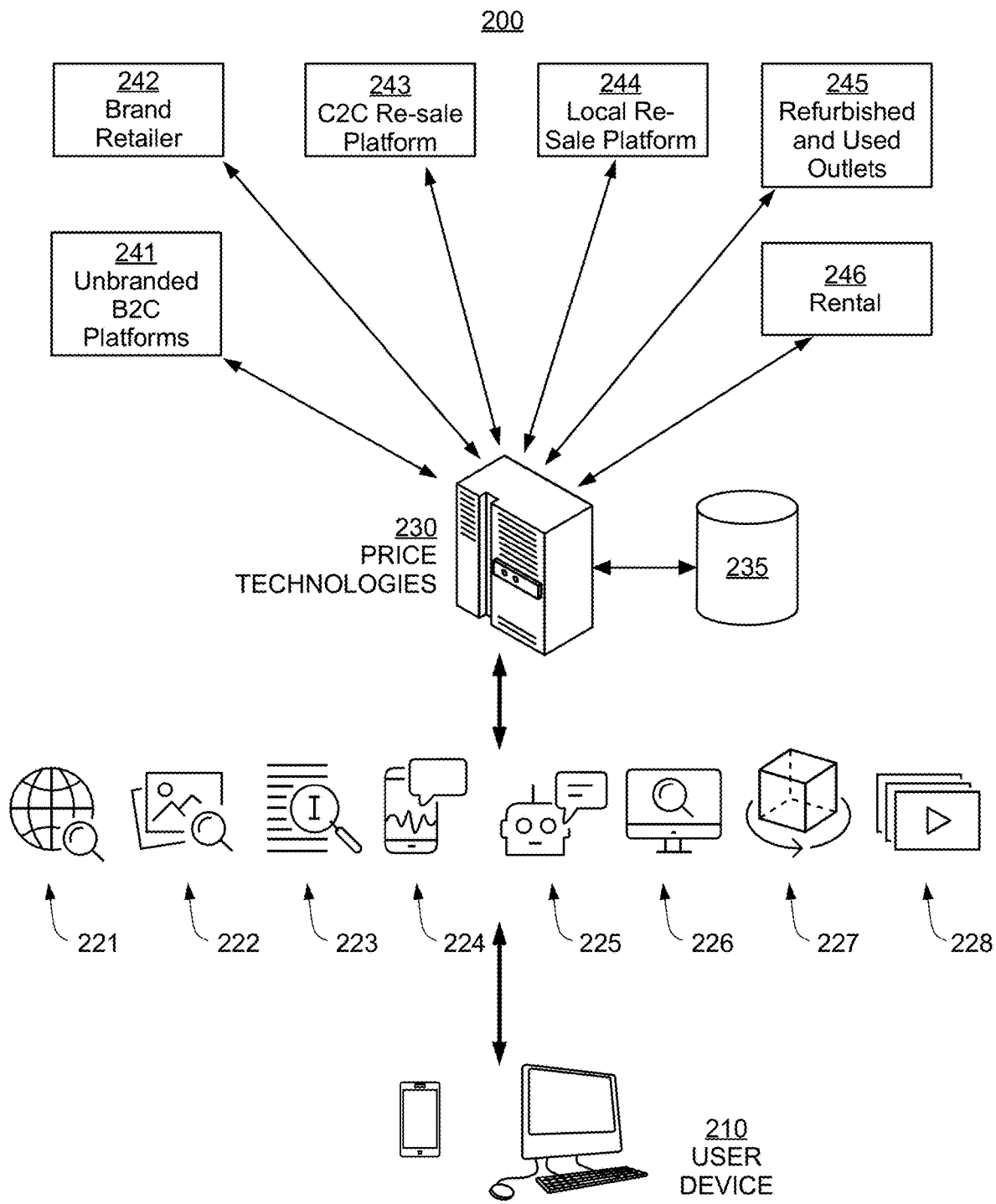
FIG. 2 is an exemplary architecture diagram for an illustrative deep learning-based product matching system, according to some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

PRICE TECHNOLOGIES is a trademark name carrying embodiments of the present invention, and hence, the aforementioned trademark names may be interchangeably used in the specification and drawing to refer to the products/services offered by embodiments of the present invention. The terms PRICE TECHNOLOGIES, PRICE.COM, and PRICE may be used interchangeably in this specification to describe the multi-model, multi-modal product matching algorithm, the product matching platform and/or service, as well as the company providing said platform and/or service. With reference to the figures, embodiments of the present invention are now described in detail.

Introduction and Overview

Broadly, embodiments of the present invention relate to methods and systems for using supervised deep-learning models to determine one or more objects that match a given reference object, and pertain particularly to matching goods and products having identical or highly similar attributes.

More specifically, embodiments of the present invention are directed to first selecting a deep learning-based product matching model based on various factors such as product category, type, and user preference, and creating a list of candidate products, then using the selected product matching model to extract signatures from candidate product attribute data having multiple modes, and to generate match scores or match probabilities from these. That is, multiple product matching models are developed and trained by the inventors to analyze structured and/or unstructured product attribute data having multiple modes. This multi-model multi-modal (M4) system provides highly accurate product matching results across various vendor platforms. In what follows, overviews of the general object matching problem and the PRICE multi-model multi-modal product matching system are provided, before illustrative and exemplary embodiments of the invention are presented in detail.

The Object Matching Problem

Object matching algorithms have been studied by computer scientists for decades. An object may refer to any physical or virtual entity that can be represented digitally, and the goal of different matching algorithms or processes may differ based on the type of objects under consideration, how such objects are represented, and how much computational power is available. For example, a conventional text matching problem studies semantic correspondence and may have any of the following formulations:

(1) determine if two text strings are the same;

(2) determine if two text strings are the same after lowercasing and/or removing certain characters, such as punctuations;

(3) find a metric that measures the distance between two text strings as the minimum number of insertions, deletions and substitutions that transform one string into another; and (4) determine a similarity between two text documents by counting the number of shared words.

Each of the above exemplary formulations is clearly defined mathematically, in terms of textual and combinatorial analysis, and the desired solution to each problem is deterministic and unambiguous. By comparison, taxonomy, which refers to systematic classification of objects and concepts, especially in the biological field, is a statistical matching problem with much less structure. Taxonomy is generally a two-fold matching problem. First, criteria for "sameness" needs to be defined for entities of the target domain, as no two organisms are identical to the cellular or molecular level; second, methods need to be developed to declare two entities to be the same. For example, in the biological taxonomies of plants and animals, living or fossilized organisms are first classified or ranked into a hierarchy including domain, kingdom, phylum, class, order, family, genus, and species. A species may be defined as a group of closely related organisms that can interbreed to produce fertile offspring. Other ways of defining a species may rely on karyotype, DNA, morphology, behavior or other identifiable characteristics or attributes. Thus, in taxonomy, matching one organism to another does not require that the two organisms be clones or carbon copies of each other, but rather, that they fall into a target group such as a species. In principle, one can consider each organism to have a set of measurable characteristics $v_1, v_2, v_3, \ldots, v_n$ that individually may arise from different modes of data as indicated by karyotype, DNA, etc., in the list above, from which the organisms can be classified or matched into the entire hierarchy. Recently, machine learning systems have used such variables to produce biological and other types of taxonomies, such as search engine taxonomies (e.g., Google, Microsoft/RING) and ontologies in insurance and finance.

The PRICE Multi-Model Multi-Modal (M4) Product Matching System

In the present disclosure, the matching problem is defined in terms of a matching objective or matching metric. For example, given two objects X and Y each represented or described by variables $v_1, v_2, v_3, \ldots,$ and $v_n$, a distance measure m(X, Y) may be defined in terms of quantitative differences between corresponding values of the variables, and the objects X and Y may be declared a match if m(X, Y) is approximately equal to 0, and not a match if m(X, Y) exceeds a predefined or configurable threshold. Likewise, a similarity measure may be used in place of the distance measure, which upon exceeding a threshold may result in a "similar" decision rule. An exemplary similarity measure may be a probability p(X,Y) that describes the likelihood that the two objects are the same. Variables $v_1, v_2, v_3, \ldots,$ and $v_n$ above may be of any format, form, or type that can be represented and stored digitally. Each variable may belong to a different mode of communication, such as text, speech, audio, image and video data. That is, each type of object-representing or object-characterizing data, such as text, audio, image, and video data, may be considered a "mode" of data, and a multi-modal object matching problem is one that matches or compares objects having two or more modes of associated descriptive data.

Product matching, which generally refers to a data analysis process to determine whether two given commercial goods or products are identical or are both variations of the same product, often involves multi-modal data, as commercial products are typically described with at least text and image. However, conventional product matching systems generally rely solely on structured data, such as alphanumeric UPC/SKU codes for the matching process, and only use other multi-modal product information data to verify matching results and to correct matching errors. When these alphanumeric codes are missing or incorrect, such as for customer-to-customer (C2C) re-sale of used items, conventional product matching systems perform poorly.

Unlike conventional systems, PRICE is a novel, deep learning-based, multi-model, multi-modal (M4) product matching system that leverages both structured and unstructured data in finding identical, equivalent, and/or generic matches to a given reference product. For example, given the reference product from a first database, PRICE finds, from the same database or from other databases, matching products that may be identical to the reference product, matching products that may be a variation of the same product such as with different packaging, matching products that may be generic versions of the branded product, and/or matching products that may have highly similar specifications. Such matching products may be of different product types or conditions, such as new, used, or rental. By utilizing novel mode-specific data matching analyzer modules each built upon deep learning networks and trained for different product categories, and by aggregating over multiple modes of analysis data, the PRICE M4 product matching system provides a high-precision, generic product matching solution that enables accesses to a richer retail landscape, capturing matching products that have not previously been included in price comparison searches, and expanding discovery and buying options to include not only new, but also, used, refurbished, rental, private label, and offline products. While private label or generic goods are often missed in other comparison shopping search results, they have become much more mainstream given the technical advancements in mobile computing, ecommerce, and social networking, as well as changes in other social-economic factors in more recent years.

As an illustrative example, FIG. 1 shows a product matching result 100 obtained using an embodiment of the PRICE M4 system. Given a target reference product 110, the PRICE M4 systems may find a matching new product 120 having a different color, an equivalent product 130 under the same brand and having the same configurations, but different headboard styles, and a used product 140. Each product listed is described by image data, different classes of textual data including numerical data (e.g. title, product description, price), and categorical data (e.g., color, condition). In generating these matches, the PRICE M4 system may first analyze image data and textual data associated with the reference product to extract categorical data (e.g., convertible crib, furniture, pine wood, DaVinci brand, etc.), then select a matching model based on available categorical data and/or other factors such as user preferences on shipping and delivery, before applying the selected matching model to compare the multi-modal attribute data of candidate products to those of the reference product.

Exemplary ecommerce platforms that may be searched by the PRICE M4 system include, but at not limited to, Amazon, Walmart, Google Shopping, EBay, OfferUp, Letgo, Mercari, AliExpress, Wish, Vipoutlet, Thrifty Car Rental, Mscape, SMElectronics, Goodwill, The Salvation Army, Poshmark, Rent the Runway, RealReal, and the like. Candidate products that are compared to the reference product may be in various conditions, states, or types, including but not limited to, new, used, refurbished, renewed, open-box, generic, rental, offline, local resale, and auction. In addition to general consumer products, the PRICE M4 system may also be applied to verticals that include, but are not limited to, over the counter medication and prescriptions, automobiles, boats, recreational vehicles, credit cards, mortgages, and digital goods such as software, mobile apps, games, e-books, streaming media, webinars, and blogs.

System Architecture for a Multi-Model Multi-Modal (M4) Product Matching System

FIG. 2 is an exemplary architecture diagram 200 for an illustrative deep learning-based product matching system, according to some embodiments of the present invention. A user may provide a search query via user device 210 to PRICE TECHNOLOGIES server 230, where the query may comprise one or more of a web search keyword or URL 221, an image 222, a text string 223, a voice input 224, a chatbot conversation 225, a user input received via a browser add-on 226, an augmented reality/virtual reality input 227, a video clip 228, or any other explicit or implicit user inputs that can be used to identify a target reference product to be matched to.

PRICE TECHNOLOGIES server 230 may comprise one or more internal and/or external product databases 235, which may be located within the server, remotely, or in the cloud. The reference product may be compared to a set of candidate products from database 235 to find a list of matching products, using a matching model selected based on the user query and retrieved from database 235.

Database 235 may be periodically updated by adding product records collected from different vendor platforms, including but not limited to, brand retailer 242, un-branded B2C platform 241, C2C re-sale platform 243, local re-sale platform 244, refurbished and used product outlets 245, and rental platform 246. In some embodiments, database 235 may be updated on-the-fly by pulling new product data from the different vendor platforms when few matches are found within the existing database.

Figure 3:
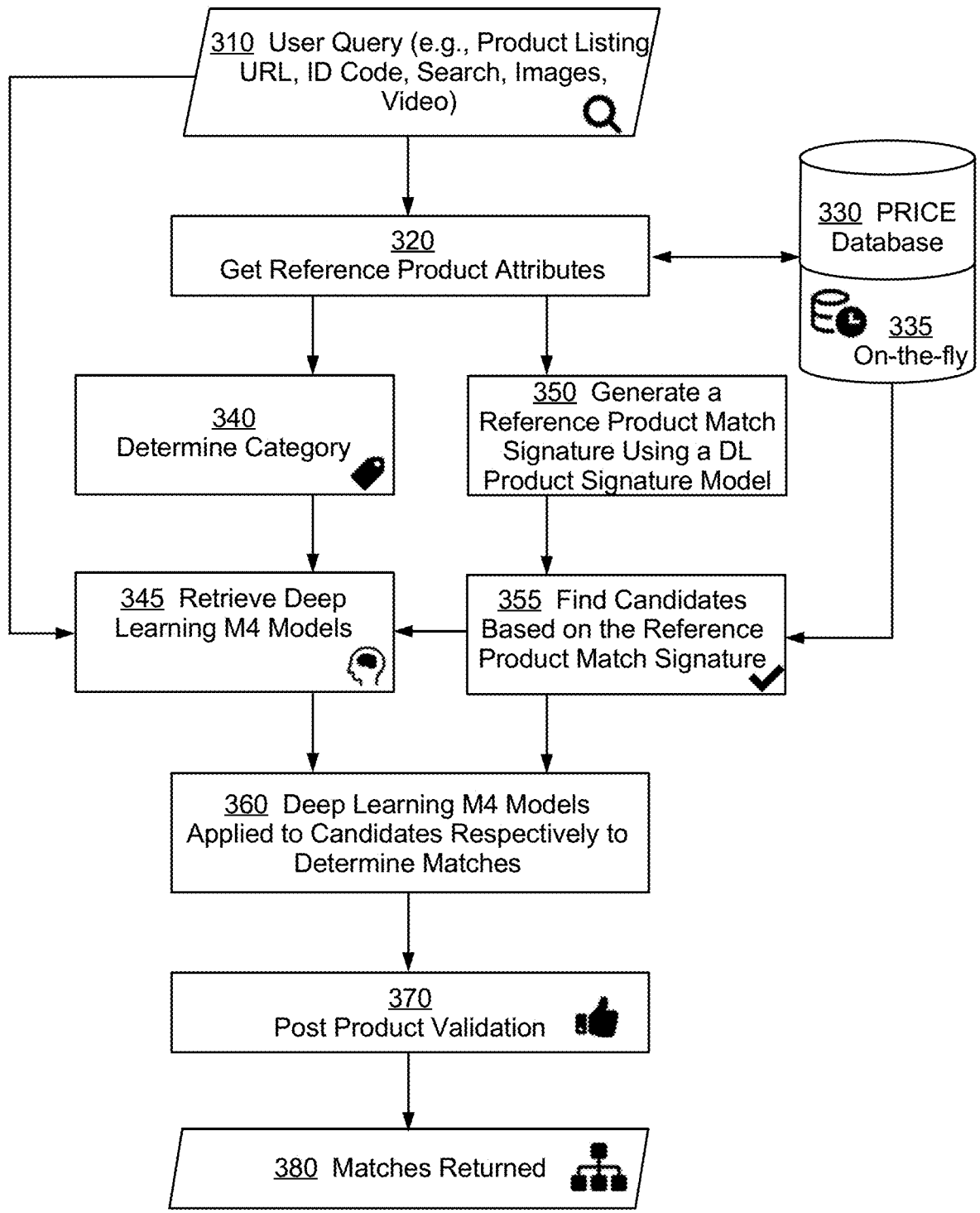
FIG. 3 is an exemplary flow diagram for an illustrative deep learning-based product matching process, according to some embodiments of the present invention.

More specifically, FIG. 3 is an illustrative flow diagram 300 providing an exemplary process for obtaining products that match a reference product as specified by a user query, according to some embodiments of the present invention. A reference product, also called a source product or a target product, is a product item for which matching products are to be found.

In various embodiments of the present invention, a "user" may refer to a person, a group of people, a commercial entity such as a company, a computing entity such as a server or a database, or any other human or non-human entity capable of providing a query for a reference product. For example, a human user may access the PRICE M4 matching system online to price match an item that he or she is interested in. In another example, a customer-to-customer (C2C) platform may send a match request for a used item to the PRICE M4 matching system, to determine a current trending price as a basis for adjusting a listing price for the used item.

A "user query" may be any input to the system that can be used to describe, characterize, define, specify, or identify, explicitly or implicitly, a target reference product to be matched to. That is, a user query may be any selection or combination of digitized textual, numerical, categorical, audio, and visual attribute data, including but not limited to, product names, barcodes, dimensions, categories, conditions, images, audio clips, video clips, web addresses, URLs, and listings as provided by the user entity, and that can be used by the PRICE system to determine one or more reference product attributes in a process step 320, from A PRICE database 330.

In one example, the user query may comprise at least one reference attribute data item for the desired reference product directly, where the at least one reference attribute data item may be an identifier, such as a product name, a product photo, a product listing, or a product identifier code selected from a barcode, a QR code, a stock keeping unit (SKU) code, a Universal Product Code (UPC), an International Standard Book Number (ISBN), an Amazon Standard Identification Number (ASIN), an European Article Number (EAN), and a Manufacturer's Part Number (MPN). Such identifier codes may be unique for each product item, or may be non-unique, for example, for identical product items having different packaging. Such identifier codes may also be vendor specific, or may be universal across all vendor platforms.

Once an identifier is extracted from the user query for the reference product, this identifier may be used as a search key into PRICE database 330 to generate or determine reference product attributes in step 320. Such attribute data may be multi-modal, having at least two data modes, where each data mode is a type of characterization of the reference product, and where exemplary data modes include, but are not limited to, text data classes, categorical data, pre-compared engineered features, audio data, image data, and video data. Text data classes refer to different forms of spoken or written language. Exemplary text classes include, but are not limited to, title (e.g., abbreviations and/or phrases), product description (e.g. prose written by the manufacturer or vendor), reviews (e.g., numerical score or prose written by past users), rankings and labels (e.g., best-selling product within a given category) and the like.

Furthermore, a user query may comprise user attributes such as implicit or explicit user selections, preferences, and traits. For example, a user may prefer certain colors or styles of furniture such as pinewood in cherry color, may be looking for second hand furniture, or may be located in a particular area for furniture delivery. Correspondingly, the user query may contain user attributes pertaining to such information, so that the PRICE M4 system can reduce the product space for product matching accordingly.

PRICE database 330 may comprise a pre-populated and pre-computed portion, and a dynamic portion 335 that may be updated on-the-fly. The division between the two portions may be physical or logical, where new on-the-fly product entries may be copied into or consolidated with the pre-computed portion periodically or on-demand. Updates to PRICE database 330 may occur when it is determined that the reference product cannot be found, or does not exist, in database 330, and one or more other databases, some external as controlled by third party vendor platforms, are searched for the reference product. If found in an external database, product record or attribute data for the reference product may be retrieved from the external database, and added to PRICE database 330. Such updates may be performed on-the-fly or in real-time, where a user query for a reference product may reveal that the reference product does not exist in PRICE database 330, and an update is performed during the matching process steps shown in FIG. 3. Such updates may also be performed periodically in non-real time, where a list of new reference products may be created by the PRICE system, for example, by analyzing currently trending products on social platforms, and each reference product on the list searched in PRICE database 330 to ensure the database is up-to-date.

At a next process step 340, a category for the reference product may be determined, and a deep learning based M4 product matching model is retrieved at step 345 for this specific product category. For example, a deep learning based matching model for a furniture item may learn to emphasize more on colors, dimensions, and weight, while a deep learning-based matching model for baby food may learn to emphasize more on the ingredient list. More details on category-specific or class-specific M4 model selection is provided in reference to FIG. 5. In this disclosure, PRICE's M4 product matching system or "M4 system" refers to a system that encapsulates components for performing all steps shown in FIG. 3, to determine one or more products that match to a given reference product; on the other hand, PRICE's M4 product matching model or "M4 model" refers to a single neural-network based product matching model that generates a matching probability or a matching decision between a reference product and a single candidate product.

In some embodiments, the retrieval of a previously trained deep learning M4 product matching model at step 345 may be further based on one or more user attribute data items extracted or derived from user query 310. For example, the user attribute may be a location identifier specifying whether the user is located in North America or in Asia. As product specifications and preferences may differ significantly between the two continents, the PRICE M4 product matching model trained on data classified into different geographical regions may emphasize on different features of the product. Similarly, the user attribute may comprise a gender of a human user, an age, an age range, occupation, first language, and/or other user characteristics. In another example, the user attribute may be a user preference. For example, the user may be looking for a product under a particular brand, or may be looking for a used or rental product rather than a new product. In some embodiments, depending on how training data sets are organized, different M4 models may be trained respectively to match products across different type or condition categories, such as new-to-new, new-to-used, and used-to-rental.

Based on reference product attributes obtained at step 320, one or more reference product match signatures may be created in a step 350, for example, using a deep-learning based product signature generation model. In some embodiments, such reference product match signatures may be generated from at least one attribute data item associated with the reference product, such as a keyword, an image, or a categorical variable. In some other embodiments, the reference product match signatures may be further generated from or based on the user query. For example, different reference product match signatures may be generated depending on if the user is looking for new or used products. Furthermore, in some embodiments, a reference product match signature may be predetermined for the reference product, and saved with other product attribute data in PRICE database 330. In some embodiments, the deep learning product signature model in step 350 may be used to update a previously generated and saved product match signature, for example, based on the current user query. In another example, this signature model may take into account currently trending styles and brands in updating the reference product match signature.

Next at a process step 355, candidate products may be determined, or extracted from PRICE database 330, based on the reference product match signature from step 350. That is, to improve the efficiency of the matching process, the reference product may be compared to candidate products on a list, or in a reduced product space, in a process step 360, instead of being compared to every single product saved in database 330.

As discussed previously, the selection and retrieval of a matching model in step 345 may depend on a reference category associated with the reference product, and/or user attributes. Thus, in some embodiments, a generic, reference category-specific matching model may be used to compare the reference product to each of the candidate products determined through process step 355. In some embodiments, model selection in step 345 is also based on one or more user attribute determined from user query 310. In yet some other embodiments, different PRICE M4 product matching models may be used to compare the reference product to different candidate products. That is, for at least one candidate product, the M4 model used may be based on a candidate product attribute data item. For example, the candidate product attribute data item may be a product category (e.g., furniture vs. baby food), type (e.g., new vs. used), brand, or a target consumer group. Product type may also be called a product condition, and may include, but not limited to, new, used, refurbished, renewed, open-box, generic, rental, offline sale, local resale, and auction. The target consumer group may be defined in terms of consumer age range, gender, geographical location, occupation, first language, or other user characteristics and/or preferences.

At process step 360, for each given candidate product, a retrieved deep learning M4 product matching model is applied to compare or match the given candidate product to the reference product. Each product $O_i$ may be represented by variables $v_{i1}, v_{i2}, v_{i3}, \ldots, v_{in}$ that in the general case have more than one mode, and which may include mistakes and/or missing values. A match score or measure m may be computed for each candidate product, against the reference product, from the attribute data of the reference product and the candidate product. Recall such attribute data for each product may be multi-modal. More details on M4 product matching model design is provided in reference to FIGS.

6-11. The match score m may refer to any quantitative distance, probability, correlation, resemblance, and likelihood measures that may directly or indirectly indicate whether two products resemble or are identical to each other. For example, in some embodiments, identical products that match exactly, and/or equivalent or generic products that match with a non-zero likelihood or probability may be returned from the matching process in step 360, where a computed match score may be compared to a predetermined or a dynamic threshold.

It would be understood by persons skilled in the art that the term "match score" above may refer to a similarity score, similarity measure, distance metric, distance measure, variations thereof, and the like, all of which may indicate quantitative, mathematical measures of closeness or resemblance of two objects. Herein, all such concepts are subsumed under the term "match score." In the case of a similarity score, high values may indicate closeness, and in the case of a distance measure, low values may indicate closeness. Having a match score meeting a threshold refers to having a similarity score above the threshold, or having a distance metric below the threshold. When such measures are normalized, for example, between 0 and 1, a distance metric may be computed from a similarity score by a subtracting the similarity score from 1.

Furthermore, matching results may be further validated at a step 370 to remove identifiable errors, such as those with outlier prices, and the remaining match results 380 may be returned to the user. In some embodiments, post product validation process 370 may include steps to simply compare a price of each matching product to an average price to remove outliers. In some embodiments, post product validation process 370 may include steps to cluster matching products from step 360 based on an attribute data item such as price, shipping cost, or inventory information, to determine whether an outlier cluster exists, and to remove the outlier cluster correspondingly.

While not shown in FIG. 3, the validated matching products 380 may be presented to the user, and upon a user selection of one of the matching products, an online purchase page for the selected product, or a link to the purchase page, may be provided to the user.

As an illustrative example, FIG. 4A is an exemplary screen capture of an interface for receiving a user query for a reference product, according to exemplary embodiments of the present invention. In this example, a human user is looking for a baby crib. Upon an initial keyword "crib" is input by the user into the PRICE system via a user computing device such as a tablet, the PRICE system may perform an initial search under this keyword to generate a list of potential reference products, a displayed in FIG. 4A. The user may limit the desired price range, brand, color, or other attributes of the reference product explicitly in this search process. Once these potential reference products are provided to the user, the user may further select one of the items as a reference product, where a user query may be generated to comprise an identifier of the selected reference product, and one or more of the user preference selections on price, brand, color, etc. In this particular example, the second product, a DaVinci Kalani 4-in-1 convertible crib is selected by the user as the reference product.

FIG. 4B is an exemplary screen capture of a list of products that matches the given reference product item specified in FIG. 4A. The original reference product is displayed on top, and the matching products from different vendors are displayed on the bottom. The user may choose from the listed shopping options based on offer price and product availability, and may further filter the list displayed based on product types or conditions.

Multi-Model Selection

Figure 5:
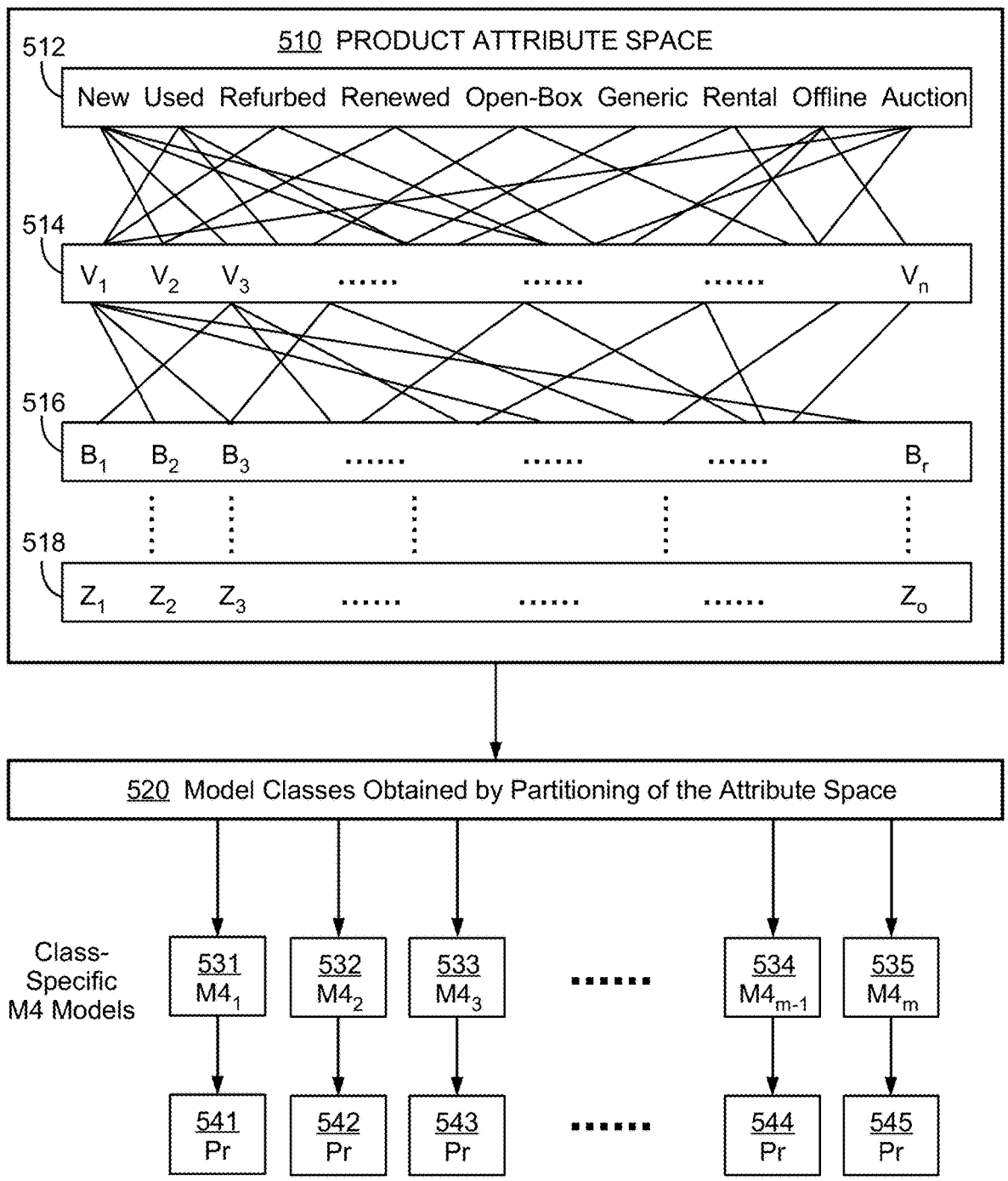
FIG. 5 is an exemplary schematic diagram for a process to determine a class-specific multi-modal matching model, according to some embodiments of the present invention.

As discussed in reference to FIG. 3, different M4 product matching models may be deployed according to one or more of user attributes, reference product attributes, and candidate product attributes. Each such deep learning-based matching model may be established through supervised learning on dedicated training data sets that have been generated or organized accordingly. FIG. 5 is an exemplary schematic diagram 500 for a process to determine or select a category-specific or class-specific multi-modal product matching model, according to some embodiments of the present invention.

To develop class-specific M4 models, first note that a number of widely used product taxonomies are available, but they may not be mutually compatible. For example, Amazon, Walmart and Google all have different taxonomies which for some products are classified differently. Therefore, if M4 is applied to taxonomic classification for generic products, conversion to a common taxonomy is necessary. Such a conversion is not trivial.

In addition, retail marketing strategies are important for model development. One strategy is branding. Branding can increase revenues by identifying products as special in some ways, for example, as having superior quality, or being widely admired within one's social network, or being widely available, and so on. For this reason, branding requires advertising expenditures and if possible, outlets dedicated to the brand's products. Furthermore, brands are generally distributed by only certain vendors, and for this reason vendors are also important for matching algorithms.

Another variable of considerable importance is the type or condition of the goods: New, Used, Refurbed, Renewed, Open-box, Generic, Rental, Offline, Auction, etc. When a user or shopper wants to find products that match a reference product, there will be informational asymmetries that are correlated with this type, with brand and with vendor. For example, Amazon and Walmart have fairly complete information on their products, even if the products are used, renewed or refurbed. They also have limited warranties on renewed products, which are usually open-box or demo products that have been tested. This is in contrast to vendors that are portals for individuals to market their products, for example EBay. EBay has an incentive for lax informational requirements since it earns fees from sales and more listings usually lead to more sales, A product item may not have enough information to distinguish very similar products, but occasionally there is an image from which such information is extractible. On the other hand, photos or images of a used article may be available, but these may be of highly variable quality and not always useful.

With generic, unbranded products, by law in most countries, it is illegal to claim that a generic product is a branded one. Therefore, retailers of generic products have an incentive ride on the coattails of branded products by giving product information that is easily confused with branded ones. If the cues intended to confuse are visual (i.e. apparel, beauty products), generic manufacturers could use machine learning models to produce fake images. For certain classes of products prone to fakery, the M4 model may include a module that trains on such fakes.

Thus, if the reference product is new with reliable product, information, it may be difficult to determine whether a used one with unreliable information is the same. For this reason, application of the MA model may require identification of factors that influence matching comparisons, and in the limit, building separate models for each combination of such factors. Models may be selected based on statistical analysis of information asymmetries. The basic method is multidimensional clustering, of which there are many varieties.

FIG. 5 is an exemplary schematic diagram 500 for a process to determine or select a category-specific or class-specific multi-modal product matching model, according to some embodiments of the present invention. Individual products may be classified within a product attribute space 510 according to different attributes such as 512, 514, 516, and 518, and a partitioning of the product attribute space into model classes 520 then leads to class-specific M4 models. In this example, product attribute space 510 is shown as populated by attributes of a single product, such as a reference product, for selecting a reference product-specific M4 model. In some embodiments, product attribute space 510 may be populated by attributes of pairs or tuples of products, such as (reference product, candidate product), for selecting a reference product-specific but also candidate product-specific M4 model. For example, product space 510 may be partitioned so that a "new-to-new" matching between a new reference product item and a new candidate product item would deploy a different M4 model than a "new-to-used" matching between the same new reference product item but a used candidate product item. In some embodiments, the attribute space may be populated for attributes of tuples involving the user as well, such as (user, reference product), or (user, reference product, candidate product).

Figure 6:
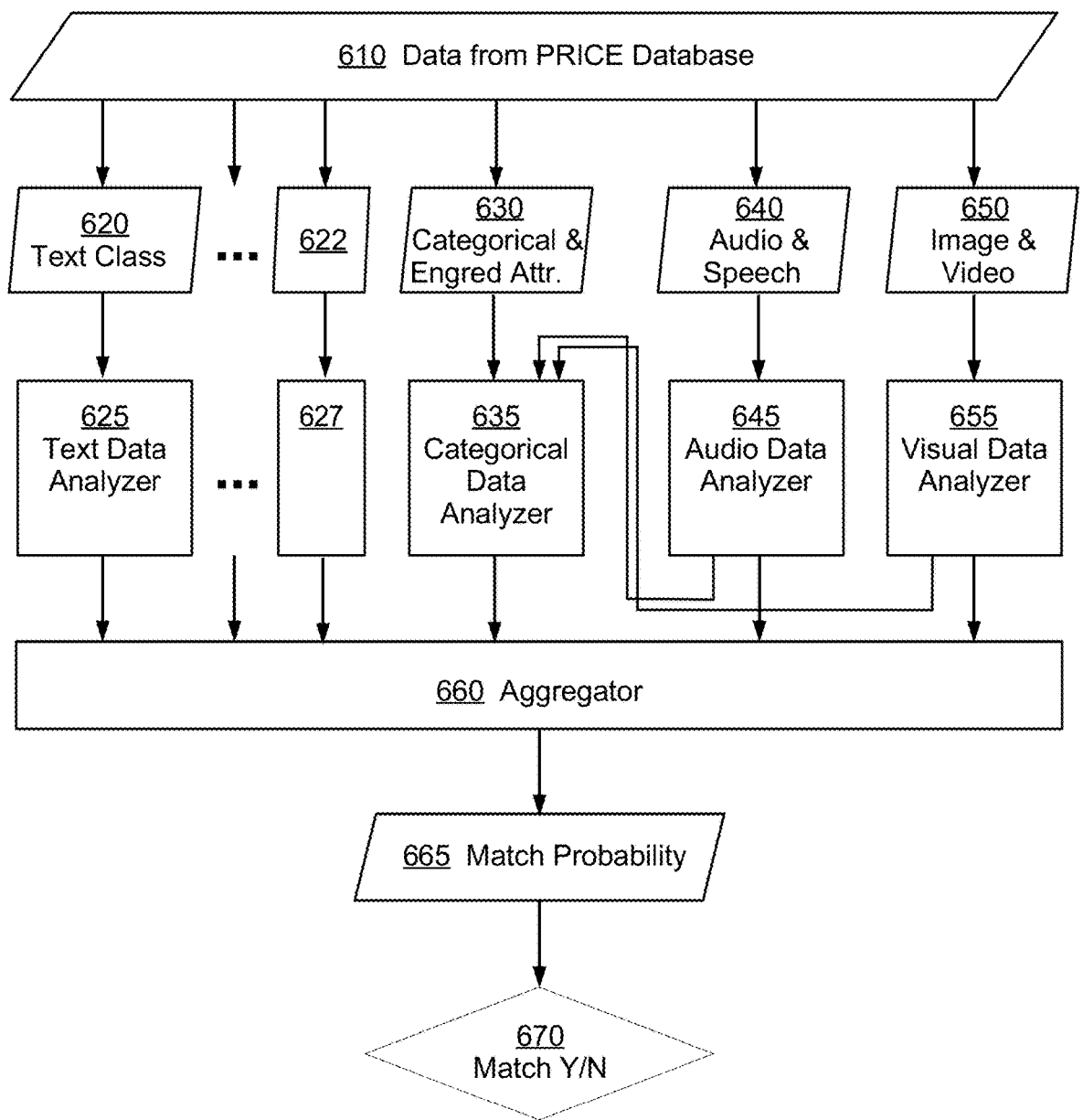
FIG. 6 is an exemplary architecture diagram for a multimodal object matching model, according to some embodiments of the present invention.

In this example, attribute 512 refers to product types or product conditions, including but not limited to, new, used, refurbished, renewed, open-boxed, generic, rental, offline, and auction. Other exemplary attributes 514 to 518 used for classification or product attribute space partition here may include vendor, brands, product category, target consumer group, and the like. As explained previously, many vendors do not carry used products, while others are dedicated to used and generic products. By using statistical modelling and/or classification, the total number of M4 models may be limited to a manageable number without compromising matching accuracy, and more training data may be available for each M4 model. That is, by partitioning the product attribute space, different model classes 520 may be obtained, and products within each model class may be matched using one of many different M4 models such as 531 to 535, each having an M4 architecture as illustrated in FIG. 6, but with different parameters trained separately from dedicated datasets. Again, new-to-new product matching may use different matching algorithms from new-to-offline local re-sale product matching. A selected M4 model may produce a probability indicating the likelihood that the class-specific products match, and those probabilities may be used to make a binary declaration of "match" or "no match".

Moreover, as different vendors may record product attribute data differently, a product database such as 330 can have an inclusive set of attribute variables that may or may not be available on all individual products. For example, while the names of products are typically available, product descriptions may be unavailable for some products, especially for used or resale items. Products that miss or have incomplete key attribute items needed for classification and model selection may be matched to a reference product using a generic M4 model.

As discussed next, an M4 architecture as shown in FIG. 6 is generic in the sense that it may be conditioned on other variables such as product classification and categorization.

FIG. 6 is an exemplary architecture diagram 600 for a neural-network based, multi-modal matching model, according to some embodiments of the present invention. In an M4 architecture's general usage, an object pair (X,Y) may be classified into mutually exclusive and exhaustive subsets $U_j$, j=1, 2, . . . , r that will have a generic M4 with architecture as in FIG. 6, but with different parameters and/or hyperparameters for each j. A conditional probabilistic notation $p((X, Y)|(X,Y) \in U_j)$ is the probability that X and Y match when (X,Y) belongs to model class $U_j$. Training of M4 networks may be resource consuming clue to model complexity, but such complexity may be reduced by using pretrained models when possible.

Multi-Modal Matching

Once a M4 selected, attribute data for the reference product and attribute for a candidate product are compared to generate a matching score or matching probability. FIG. 6 is an exemplary architecture diagram 600 for a multi-modal product matching model, according to some embodiments of the present invention. Product information 610 for both the reference product and a candidate product from the PRICE database may be partitioned into different modes, including but not limited to, text data 620, categorical and engineered attribute data 630, audio and speech data 640, and image and video data 650. In some embodiments, additional text data classes such as 622 may be extracted from different text sources, where exemplary text classes include, but are not limited to, title (e.g., abbreviations and/or phrases), product description (e.g. prose written by the manufacturer or vendor), reviews (e.g., numerical score or prose written by past users), rankings and labels (e.g., best-selling product within a given category) and the like.

Respective modes of data are then passed into data analyzers such as text data analyzers 625 and 627, categorical data analyzer 635, audio data analyzer 645, and visual data analyzer 655, to generate signature data, to be compared by aggregator 660. Aggregator 660 generates a match probability 665. By thresholding match probability 665, a match decision may be determined at step 670. The threshold used may be predetermined, and/or configured on-the-fly based on product attributes and/or use inputs.

While individual data analyzers are drawn as parallel computing components or modules in FIG. 6, the overall process flow may be partially sequential, with text data analyzed first, followed by audio data then visual data. Categorical attributes or features extracted during text, audio, or visual data analysis may be passed into categorical data analyzer 635 and combined with pre-computed categorical and engineered attribute data 630.

Figure 7:
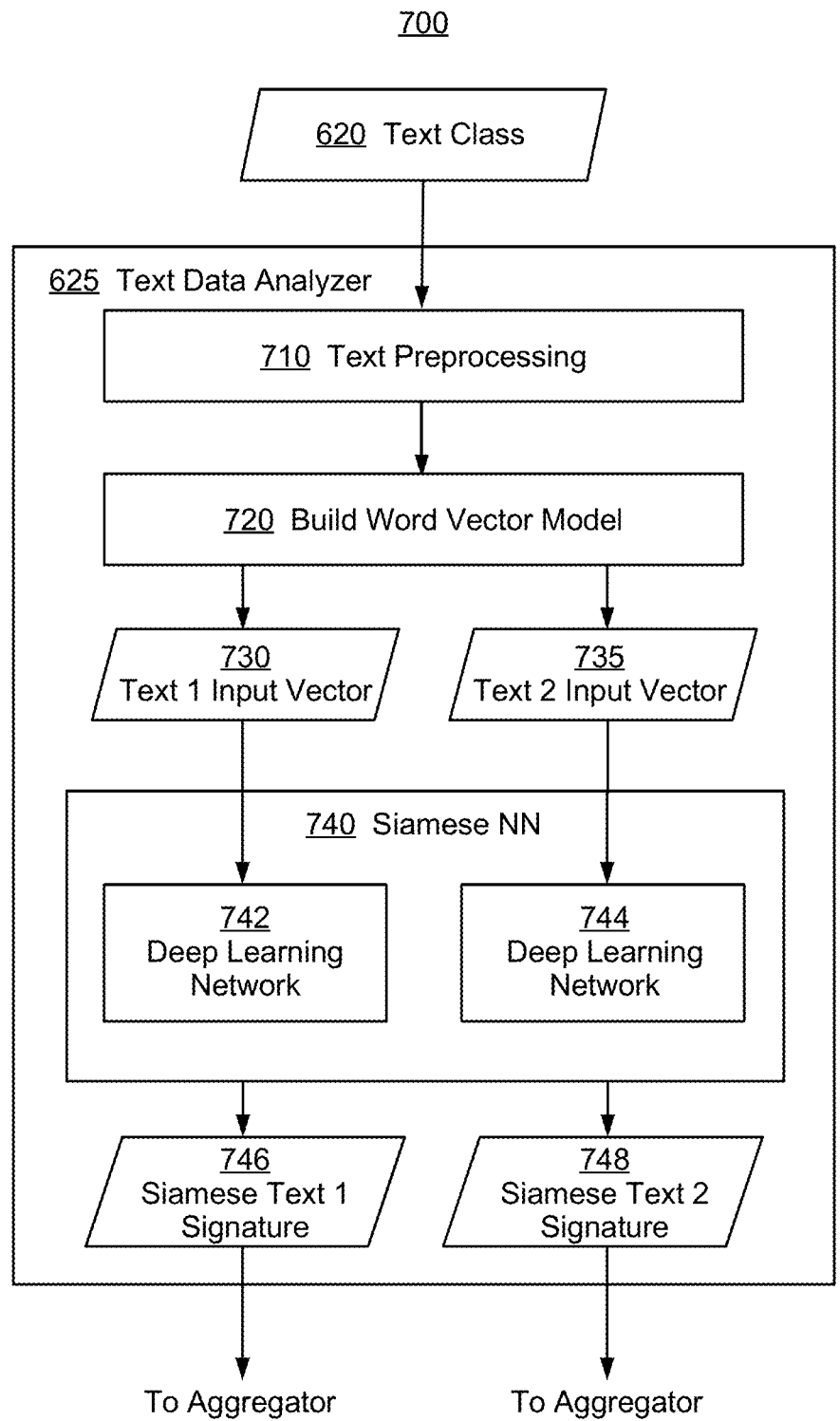
FIG. 7 is an exemplary architecture diagram for a text data analyzer, according to some embodiments of the present invention.

FIG. 7 is an illustrative architecture diagram 700 showing an exemplary text data analyzer 625, according to some embodiments of the present invention. Text class data 620 may comprise one or more text-type variables $t_{i1}$, $t_{i2}$, $t_{i3}$, . . . , $t_{iu}$ for the reference and candidate products. Text preprocessing step 710 may comprise transforming raw text inputs into a form amenable to deep learning algorithms. For a product retrieved from the PRICE database, preprocessing may have been completed previously and the preprocessed data maybe saved and retrieved as part of the product record.

At process step 720, word vector models may be built. Deep learning analysis of text data often requires the conversion into "word vectors" by any of several methods, including but not limited to, Word2Vec, GloVe, FastText, transformer models such as BERT and its variants, and many others. In some embodiments, text vocabularies may be trained separately for each text class. For different text sources, it may be necessary to train word vectors in isolation. For example, if the object has a textual "name" as well as web reviews, the languages used in these two sources are generally different enough to warrant development of individual vocabularies, to be used with different text class analyzers.

In FIGS. 7 to 11, a numerical reference 1 refers to the reference object or product, while a numerical reference 2 refers to a candidate object or product being matched to the reference product. In FIG. 7, text vectors 1 730 and text vector 2 735 are passed into a Siamese neural network (NN) 740, which comprises two mirroring deep learning networks 742 and 744. A typical Siamese NN comprises two identical NNs, with each NN taking on one of two input, and with each NN generating an output vector or "Siamese signature" having a prescribed dimension and representing a learned feature set. The two Siamese signatures may then be fed into a triplet loss or contrastive loss function to calculate a similarity or distance measure. Accordingly, a Siamese NN for textual comparison may be trained on paired texts, with the pair known to be the same or different: maximize m(X,Y) if products X, and Y are different, and minimize m(X, Y) if they are the same, where m is a distance measure. In FIG. 7, output 746 and 748 are vector "signatures" or "embeddings" for each reference and candidate products respectively. Instead of being compared directly against each other, these signatures are fed into an aggregator that aggregates signatures from multiple analyzers and compares aggregated signatures with a metric to determine sameness or differentness of the original objects. In some embodiments, signatures such as 746 and 748 may be computed once when the reference product and the candidate product were first added to the PRICE database, and saved into the database with other product attributes. When a product matching process is carried out, such signatures may be retrieved directly from the PRICE database to reduce computational cost and delay.

In the embodiment shown in FIG. 6, aggregator 660 may combine or concatenate Siamese signatures and/or other relevant feature or attribute vectors from analyzers 625, 635, 645, and 655, and compare the aggregation results to generate match probability 665. Individual Siamese NNs within the different analyzers are designed for and trained on different modes and/or different model classes of data. For example, Siamese NN 740 in analyzer 625 may be designed for and trained on product titles, by first converting into word vectors, then using a convolutional neural network; A Siamese NN in analyzer 627 may be designed for and trained on product descriptions utilizing sequence-to-sequence machine learning algorithms such as Long Short Term Memory (LSTM), Bidirectional LSTM, or one of the many transformer models. Similarly, a Siamese NN 840 in analyzer 635 shown in FIG. 8 may be designed for and trained on categorical data using a feedforward network; Siamese NN 950 in analyzer 645 shown in FIG. 9 and Siamese NN 1050 in analyzer 655 shown in FIG. 10 may each be designed for and trained on audio and visual data respectively, using convolutional neural network architectures. In a Siamese network for image mode data, standard CNN models may be used for identifying items of interest, such as color, text that can be fed into Optical Character Recognition (OCR) readers, and shape.

Furthermore, training of individual Siamese NNs mentioned above may occur as part of the overall training for the system 600 shown in FIG. 6, and training data may be prepared manually based on a specific product class or category that the reference and/or candidate products fall into.

Figure 8:
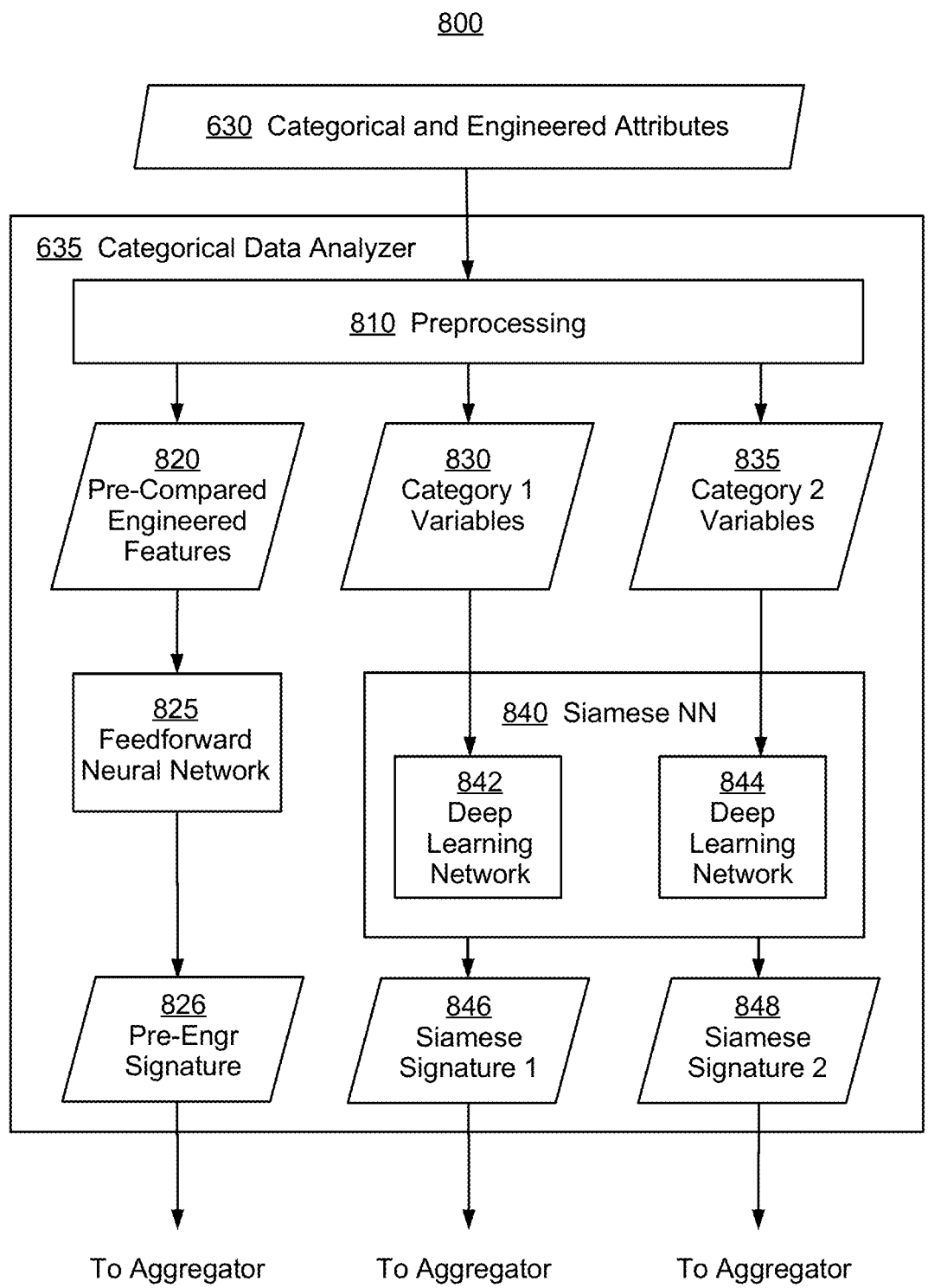
FIG. 8 is an exemplary architecture diagram for a categorical data analyzer, according to some embodiments of the present invention.

FIG. 8 is an exemplary architecture diagram 800 showing a categorical data analyzer 835, according to some embodiments of the present invention. Input categorical and engineered attribute data 630 may first be processed at step 710, before being analyzed in two separate process flows. Categorical variables 830 and 835 may be encoded and input into a Siamese neural network 840 comprising mirroring deep learning networks 842 and 844. In addition, pre-comparison of some engineered features 820 of the two objects using standard formulas may produce a measure of similarity or distance, i.e. Jaccard similarity, cosine distance and Euclidean distance. These pre-calculated or pre-computed comparisons may be passed through a feedforward neural network 825 to generate pre-engineered signatures 826, which are in turn passed to an aggregator such as the one shown in FIG. 11. In one example, a pre-compared engineered feature 720 may be the number of words two titles have in common, with a Jaccard similarity having a value of 1 if the two titles are identical, and 0 if they contain no word in common. Thus, in some embodiments, a connection may exist between a text data analyzer, such as 625 or 627, and categorical data analyzer 635, where the text analyzer may dissect, extract, or generate categorical information and/or engineered attributes for further analysis by the categorical data analyzer.

Figure 9:
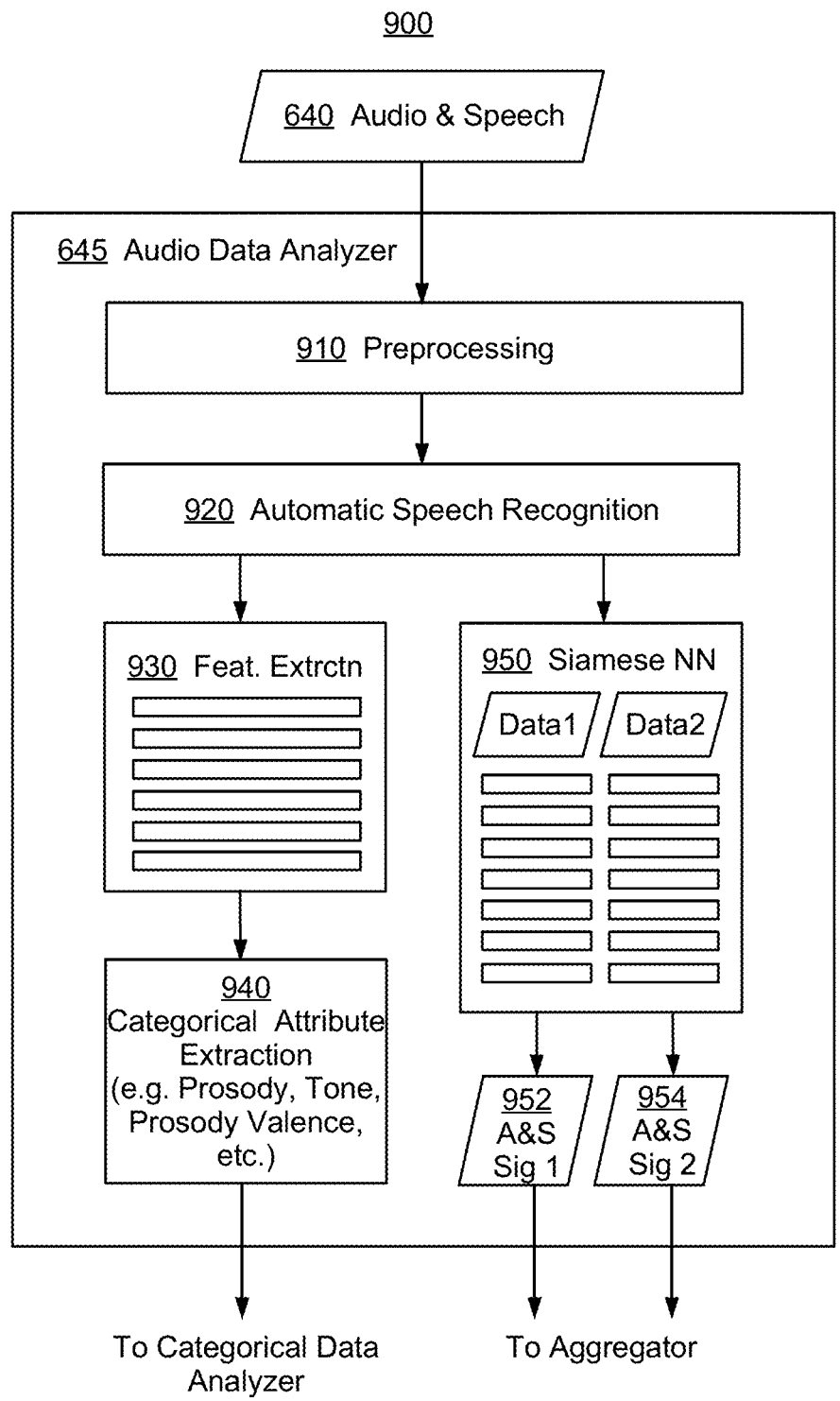
FIG. 9 is an exemplary architecture diagram for an audio data analyzer, according to some embodiments of the present invention.

FIG. 9 is an exemplary architecture diagram 900 showing an audio data analyzer 645, according to some embodiments of the present invention. Input audio and speech data 640 are preprocessed at step 910, and automatic speech recognition may be applied to the preprocessed data at step 920. Speech recognition results may be fed into a Siamese network 950 comprising deep learning networks to create Siamese signatures 952 and 954. In addition, feature extraction 930 and categorical attribute extraction 940 may be performed on the speech recognition results, to extract important words, or identify characteristics or qualities of the audio, including but not limited to speech patterns and emoting, prosody, tone, prosody valence etc. Extracted features or attributes may be passed into a categorical data analyzer such as 635, where a Siamese NN or another deep learning-based module is used to compare and generate signatures.

Figure 10:
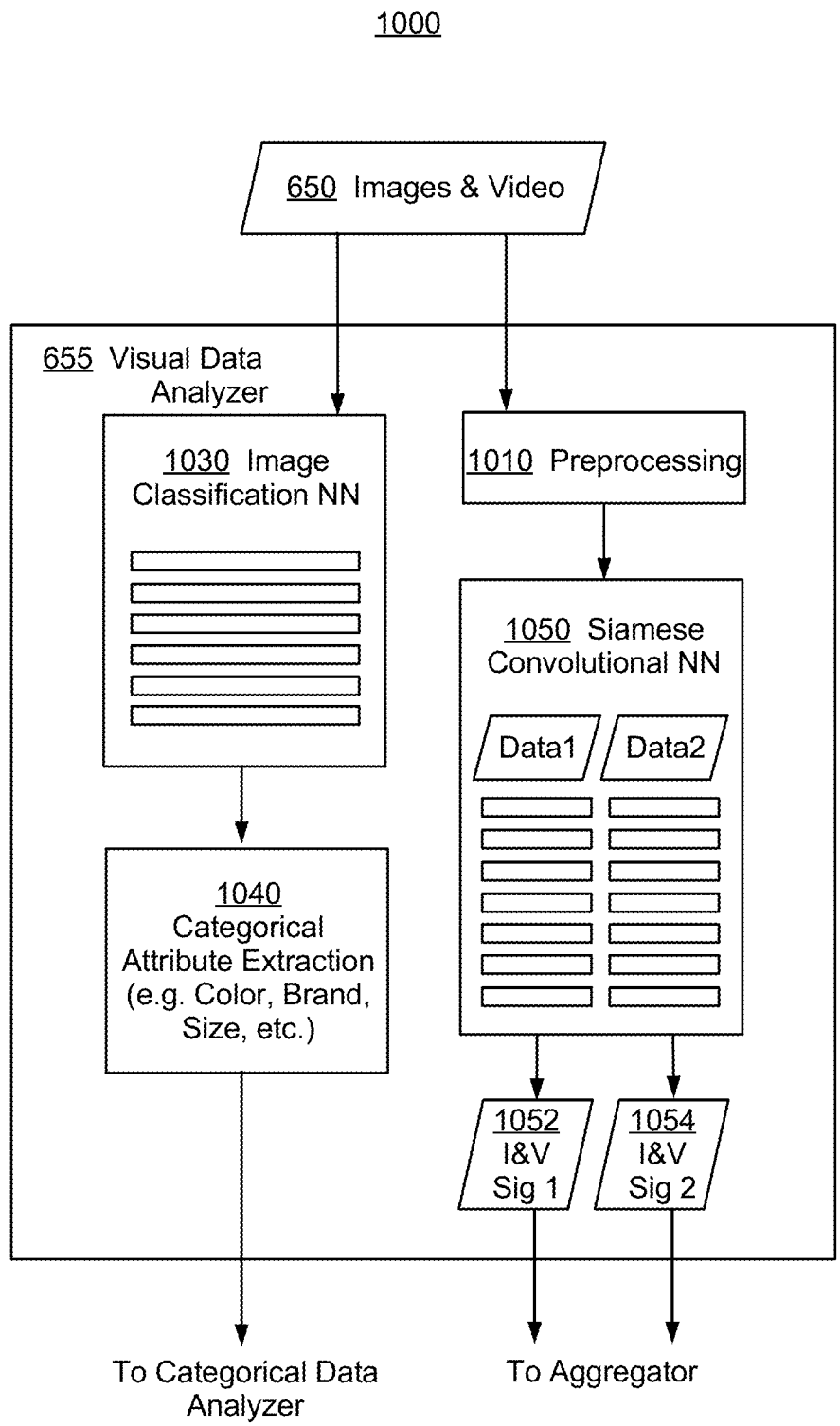
FIG. 10 is an exemplary architecture diagram for a visual data analyzer, according to some embodiments of the present invention.

FIG. 10 is an exemplary architecture diagram 1000 showing a visual data analyzer 655 having an architecture similar to audio data analyzer 645, according to some embodiments of the present invention. Input image and/or video data 650 may be passed through an image recognition and classification NN 1030 and a categorical attribute extraction module 1040, while in parallel being pre-processed, and analyzed through a Siamese Convolutional NN 1050 to generate signatures 1052 and 1054. Imagine classification NN 1030 may comprise one or more neural networks to segment objects from an image, to extract textual information from the image, and to perform scene analysis when necessary. When input 650 is a video clip, selected frames of the video clip may be passed into image classification NN 1030. Extracted categorical attributes may include characterizations of the products being matched, in terms of color, brand, size/dimension, name, and the like. Preprocessing 1010 of the input visual data may comprise one or more image and/or video processing techniques such as frame extraction, cropping, gray-scaling, down sampling, smoothing, brightening, darkening, color enhancement, background removal, filtering for noise reduction, and the like.

Figure 11:
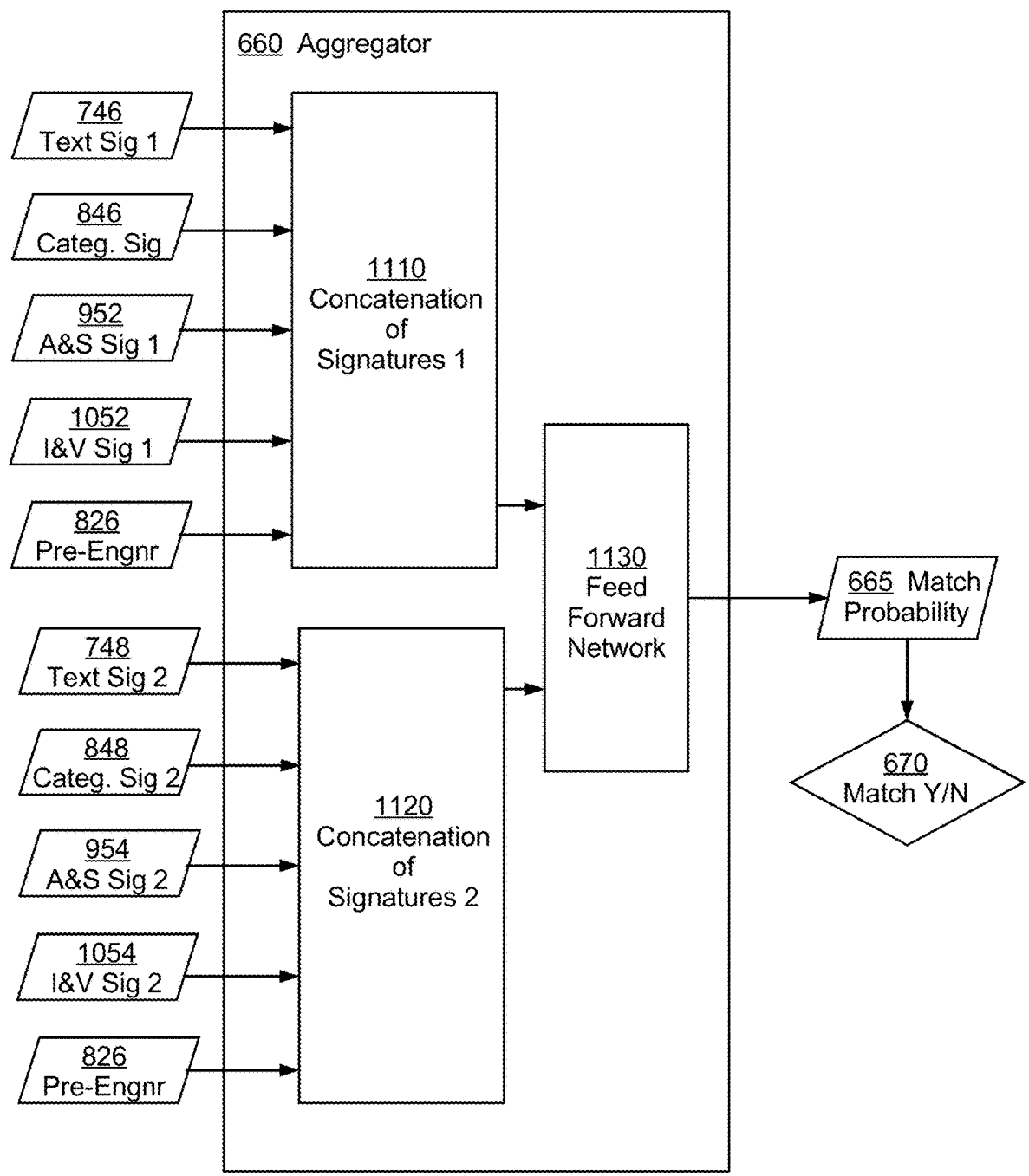
FIG. 11 is an exemplary architecture diagram for a signature aggregator, according to some embodiments of the present invention.

FIG. 11 is an exemplary architecture diagram 1100 showing a signature aggregator 660, according to some embodiments of the present invention. Previously computed signatures 746, 846, 952, and 1052, and pre-engineered features

826 may be concatenated for the reference object by sub-module 1110; previously computed signatures 748, 848, 954, and 1054, and pre-engineered features 826 are concatenated for the candidate object by sub-module 1120. The concatenations may be fed directly into a feedforward network 1130 that culminates in a SoftMax layer to produce match probability 665.

Illustrative Implementations of the Present Invention

As illustrative embodiments of the present invention, FIGS. 12A, 12B, 13A, and 13B show how the PRICE product matching system may be integrated into ecommerce platforms and social media platforms.

Figure 12A:
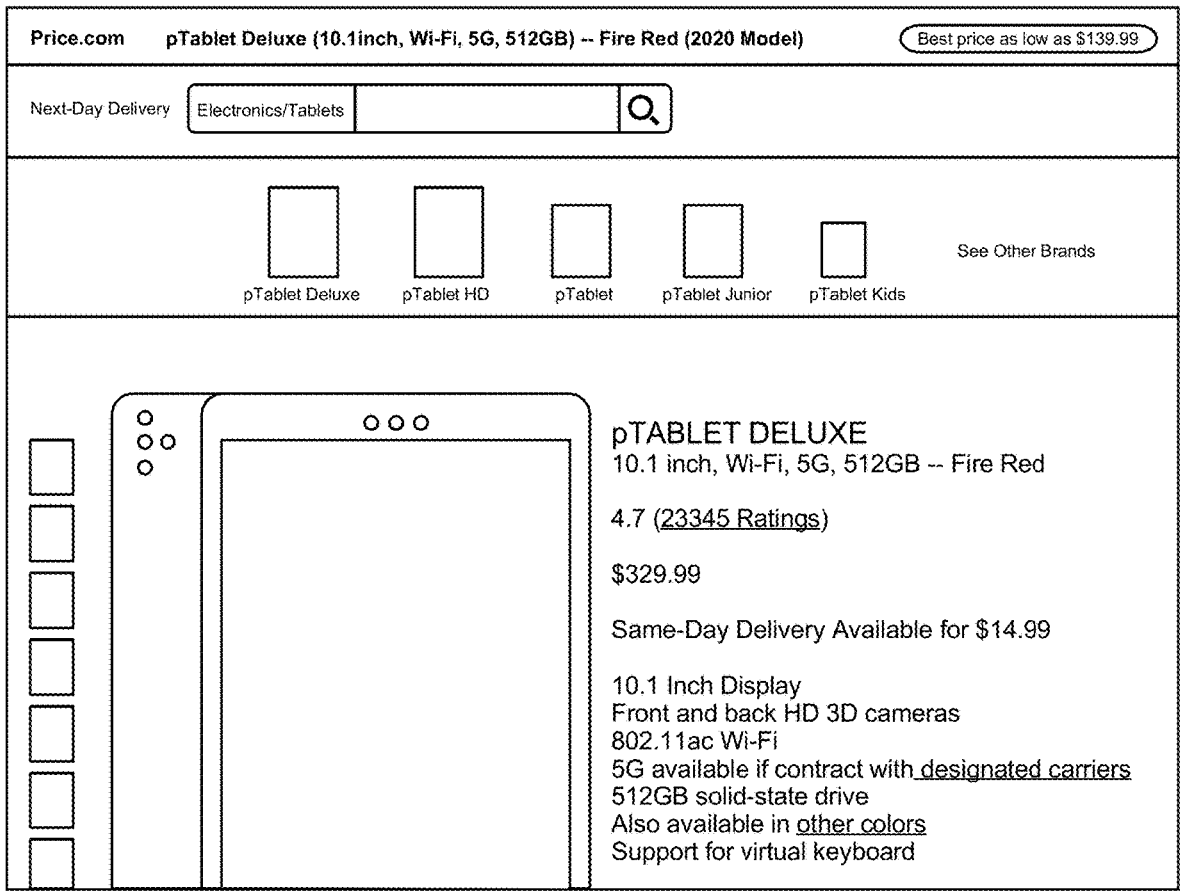

FIGS. 12A and 12B are respective illustrative screencaps showing a use case for the PRICE M4 product matching system on an ecommerce platform, according to some embodiments of the present invention. In FIG. 12A, an exemplary screen capture 1200 of a product listing page for a tablet on Amazon.com is shown, with a PRICE browser extension indicating a lower price offered by a different seller. The web browser extension may provide support for a dropdown toolbar which searches the PRICE database for matching product offers, some at cheaper prices than the product currently being viewed in the browser. In this particular example, the tablet product listed for $329.99 has been found at another site for $139.99. Clicking on the link in the PRICE extension toolbar leads to a product display page (PDP) on PRICE.COM showing many other sites where this product may be purchased, with a majority of the matching offers being at a lower price. For example, FIG. 12B is a screen capture 1250 of a product matching result for the item shown in FIG. 12A, according to some embodiments of the present invention. In this particular example, while a human user is looking at the Amazon page, the PRICE browser extension may use the Amazon listing page as a user query into PRICE's product matching system as shown in FIG. 3 to do a preliminary partial match or a full match, with a lowest price displayed in the extension bar. In some embodiments, the user query into the PRICE system may comprise public user information, or private user information that the user has agreed to share, such as IP address, physical address, gender, age, past browsing history, and the like.

Figure 13A:
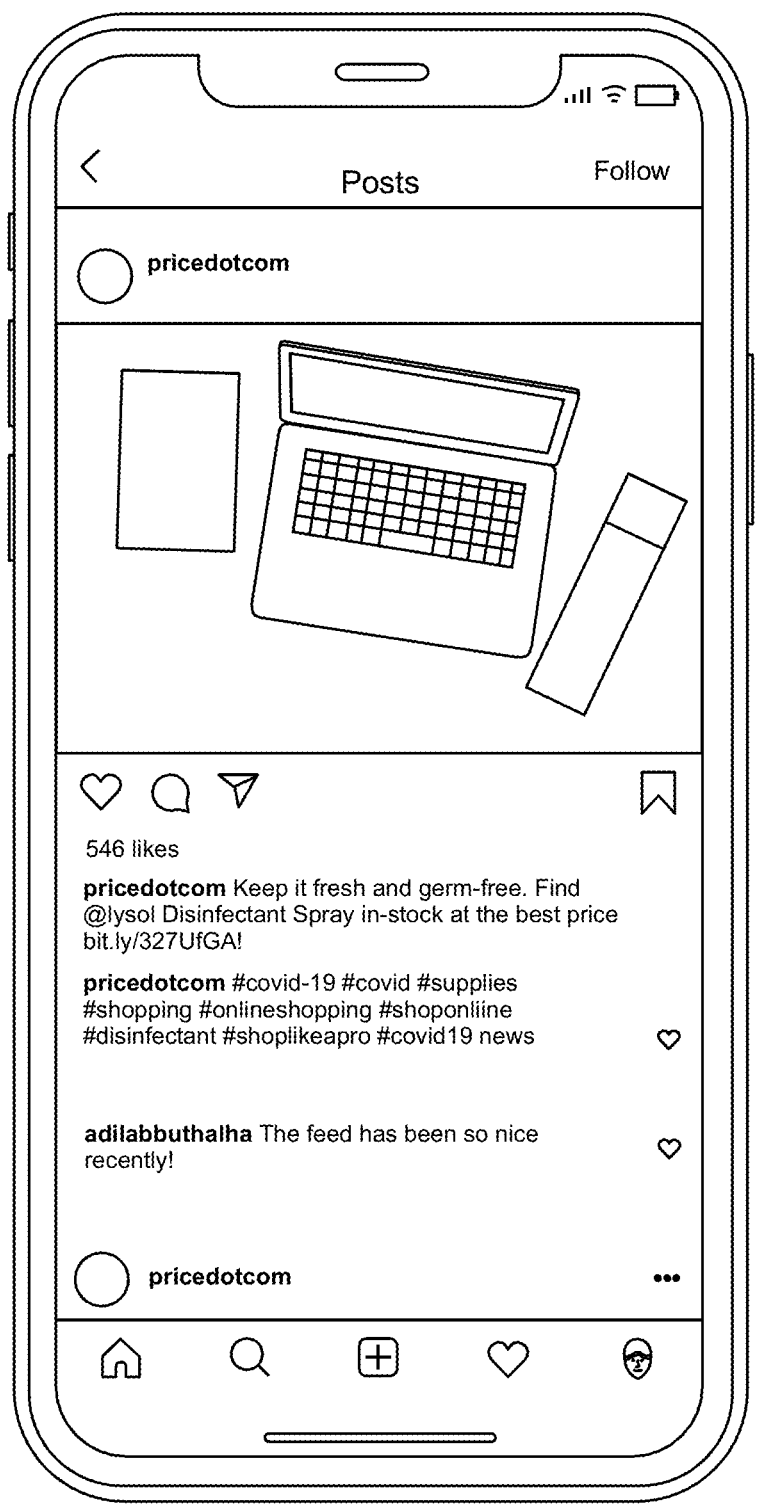
FIGS. 13A and 13B are respective illustrative screencaps showing a use case for a product matching system on a social media platform, according to some embodiments of the present invention.
Figure 13B:
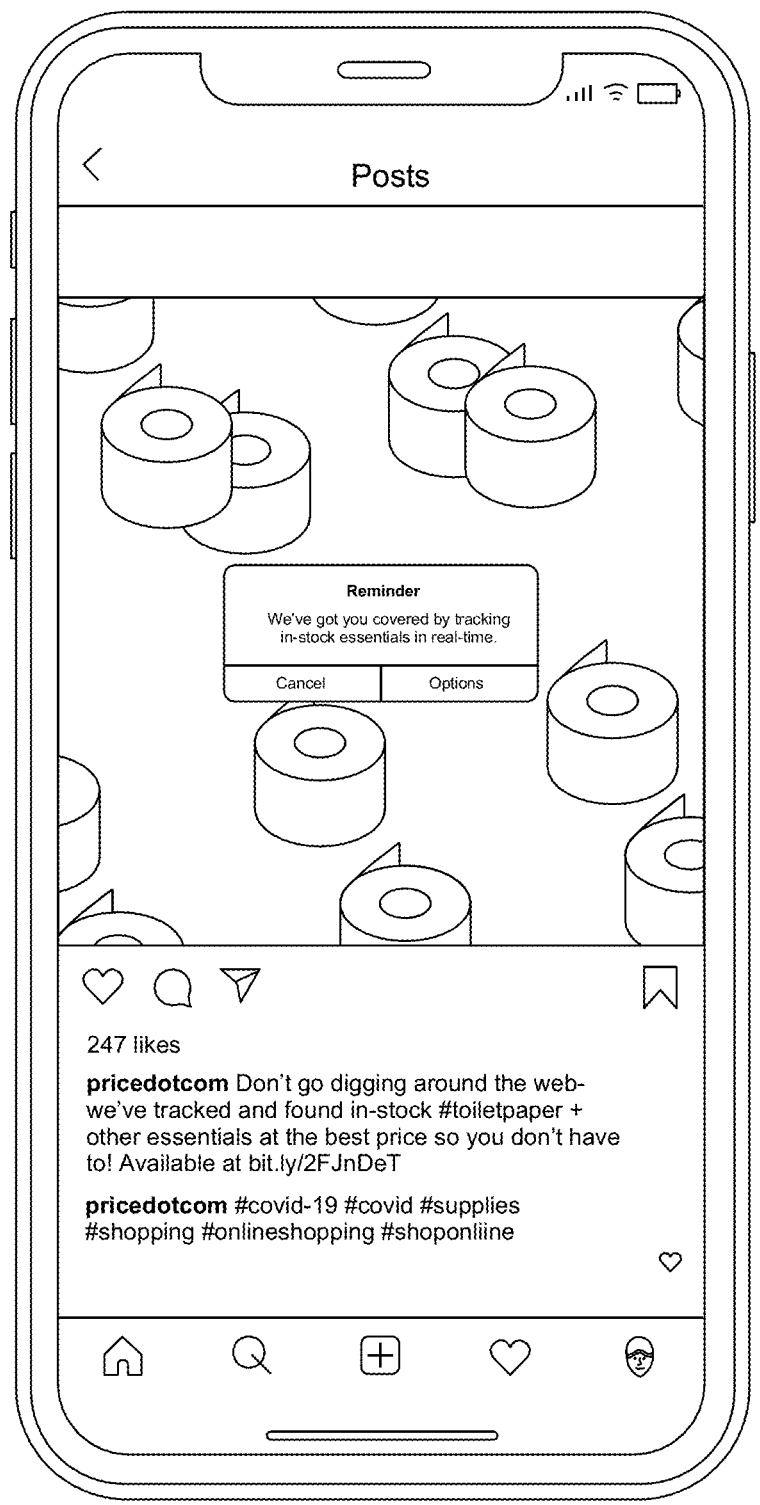

FIGS. 13A and 13B are respective illustrative screencaps showing a use case for the PRICE product matching system on a social media platform, according to some embodiments of the present invention. Upon the user's permission, PRICE may assess user needs for specific products, user interests in particular products or discounts, and user preferences on particular product features through user information including IP address, saved address, browsing histories, shopping histories, and the like. The PRICE system may further take into account of products, discussion, and events current trending on the platform, for the purpose of product recommendation to the user, for example in the form of social media posts or individual alerts. In FIG. 13A, a social media post is presented to recommend disinfectants to a user who follows PRICE's social media account during a respiratory virus pandemic. Once the user clink on the provided link, an interface similar to the one shown in FIG. 4A may be displayed. Similarly, in FIG. 13B, not only a social media post is presented, but a reminder popup is generated to collect user inputs for product search and product match.

Figure 16:
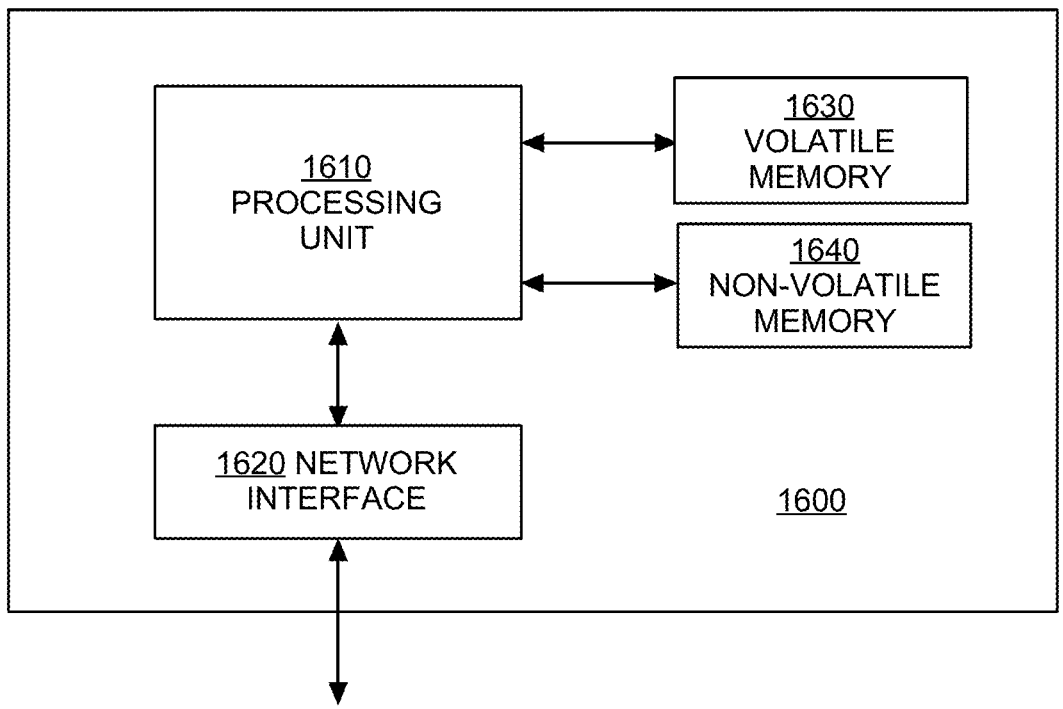
FIG. 16 is an exemplary schematic diagram of a management computing entity, according to exemplary embodiments of the present invention.

As product matches are presented to a user in the form of lists, it is also possible for the PRICE system to place sponsored advertisement in its match results. FIG. 16 is an illustrative diagram showing a self-serve advertising entry into the PRICE product matching system, according to some embodiments of the present invention, allowing merchants to place advertisements into match results provided by the PRICE system, based on one or more keywords and product features.

Implementation Using Computer Program Products, Methods, and Computing Entities

Figure 15:
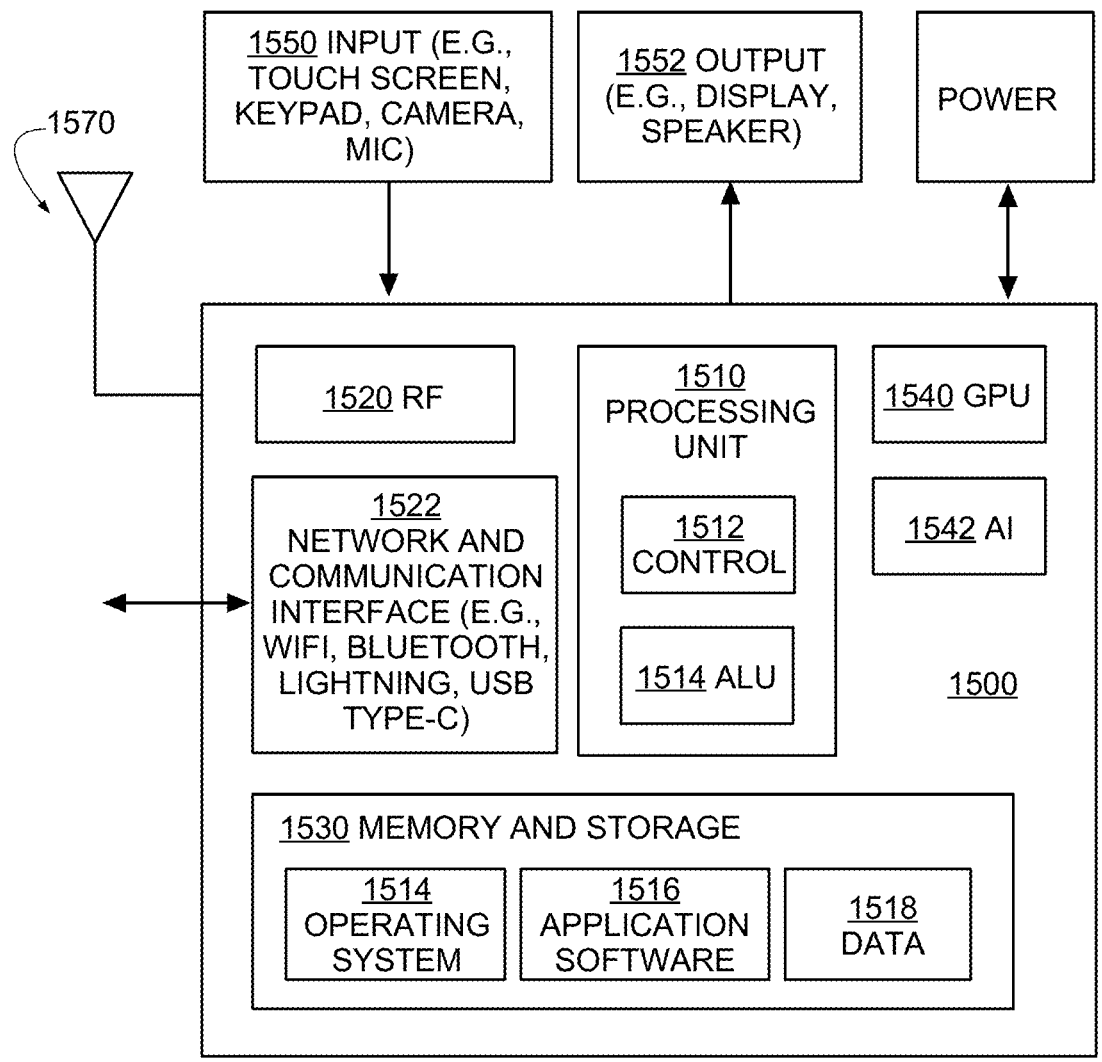
FIG. 15 is an exemplary schematic diagram of a user computing entity, according to exemplary embodiments of the present invention.

In the next subsection, exemplary client computing entities and server management computing entities that may be used to implement different embodiments of the PRICE system such as shown in FIGS. 2 and 3 are presented. The PRICE system may include one or more user computing entities 1500, connected through one or more networks, to one or more server or management computing entities 1600, as illustrated in FIGS. 15 and 16. Each of these components, entities, devices, systems, and similar words used herein interchangeably may be in direct or indirect communication with, for example, one another over the same or different wired or wireless networks. Additionally, while FIGS. 15 and 16 illustrate the various system entities as separate, standalone entities, the various embodiments are not limited to this particular architecture.

Exemplary User Computing Entity

FIG. 15 is an exemplary schematic diagram of a user computing device for implementing a system according to exemplary embodiments of the present invention. A user operates a user computing device 1500 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 1500 may be a mobile device, and may be operated by a user initiating a product matching process. On the other hand, a server such as PRICE server 230 may be implemented according to the exemplary schematic diagram shown in FIG. 16, possibly in the cloud, and possibly with logically or physically distributed architectures.

As shown in FIG. 15, the user computing entity 1500 may include an antenna 1570, a radio transceiver 1520, and a processing unit 1510 that provides signals to and receives signals from the transceiver. The signals provided to and received from the transceiver may include signaling information in accordance with air interface standards of applicable wireless systems. In this regard, the user computing entity 1500 may be capable of operating with one or more air interface standards, communication protocols, modulation types, and access types. More particularly, the user computing entity 1500 may operate in accordance with any of a number of wireless communication standards and protocols. In some embodiments, user computing entity 1500 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 1500 may operate in accordance with multiple wired communication standards and protocols, via a network and communication interface 1522.

Via these communication standards and protocols, the user computing entity 1500 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1500 can also download changes, add-ons, and updates, for instance, to its firmware, software (e.g., including executable instructions, applications, program modules), and operating system.

In some implementations, processing unit 1510 may be embodied in several different ways. For example, processing unit 1510 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1510 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1510 may be configured for a particular use or configured to execute instructions stored in volatile or non-volatile media or otherwise accessible to the processing unit. As such, whether configured by hardware or computer program products, or by a combination thereof, processing unit 1510 may be capable of performing steps or operations according to embodiments of the present invention when configured accordingly.

In some embodiments, processing unit 1510 may comprise a control unit 1512 and a dedicated arithmetic logic unit 1514 (ALU) to perform arithmetic and logic operations. In some embodiments, user computing entity 1500 may optionally comprise a graphics processing unit 1540 (GPU) for specialized image and video rendering tasks, and/or an artificial intelligence (AI) accelerator 1542, specialized for applications including artificial neural networks, machine vision, and machine learning. In some embodiments, processing unit 1510 may be coupled with GPU 1540 and/or AI accelerator 1542 to distribute and coordinate processing tasks.

In some embodiments, user computing entity 1500 may include a user interface, comprising an input interface 1550 and an output interface 1552, each coupled to processing unit 1510. User input interface 1550 may comprise any of a number of devices or interfaces allowing the user computing entity 1500 to receive data, such as a keypad (hard or soft), a touch display, a mic for voice/speech, and a camera for motion or posture interfaces. User output interface 1552 may comprise any of a number of devices or interfaces allowing user computing entity 1500 to provide information to a user, such as through the touch display, or a speaker for audio outputs. In some embodiments, output interface 1552 may connect user computing entity 1500 to an external loudspeaker or projector, for audio or visual output.

User computing entity 1500 may also include volatile and/or non-volatile storage or memory 1230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1514, application software 1516, data 1518, databases, database instances, database management systems, programs, program modules, scripts, source code, object code, byte code, compiled code, interpreted code, machine code, executable instructions, and/or the like to implement the functions of user computing entity 1500. As indicated, this may include a user application that is resident on the entity or accessible through a browser or other user interface for communicating with a management computing entity and/or various other computing entities.

In some embodiments, user computing entity 1500 may include location determining aspects, devices, modules, functionalities, and/or similar words used herein interchangeably. For example, user computing entity 1500 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In some embodiments, user computing entity 1500 may comprise a sound device, for example, earbuds or a speaker system coupled to the at least one user computing device. The sound device may serve to provide product searching and/or matching results to the user. In some embodiments, the system optionally comprises an optical device such as a projector, a projection lamp, a laser pointing system, a jumbotron, a television screen, or the like.

In some embodiments, user computing entity 1500 may communicate to external devices like other smartphones and/or access points to receive information such as software or firmware, or to send information (e.g., training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. In some embodiments, the user computing devices may use a network interface such as 1522 to communicate with various other computing entities, such as by communicating data, content, information, and/or similar terms used herein interchangeably that can be transmitted, received, operated on, processed, displayed, stored, and/or the like.

In some embodiments, data such as product descriptions and images may be uploaded by one or more user computing devices to a server such as shown in FIG. 16 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate product search and/or match. In some embodiments, speech recognition may be used. In some embodiments, artificial intelligence-based audio processing and/or computer vision algorithms may be used.

To provide for or aid in the numerous determinations (e.g., determine, ascertain, infer, calculate, predict, prognose, estimate, derive, forecast, detect, compute) described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Exemplary Management Computing Entity

FIG. 16 is an exemplary schematic diagram of a management computing entity 1600, such as PRICE server 230, for implementing an object matching or product matching system, according to exemplary embodiments of the present invention. The terms computing entity, computer, entity, device, system, and/or similar words used herein interchangeably are explained in detailed with reference to user computing entity 1600.

As indicated, in one embodiment, management computing entity 1600 may include one or more network or communications interface 1620 for communicating with various computing entities, such as by communicating data, content, information, and/or similar terms used herein interchangeably that can be transmitted, received, operated on, processed, displayed, stored, and/or the like. For instance, management computing entity 1600 may communicate with user computing device 1500 and/or a variety of other computing entities. Network or communications interface 1620 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1600 may be configured to communicate via wireless external communication networks using any of a variety of standards and protocols as discussed with reference to user computing device 1500.

As shown in FIG. 16, in one embodiment, management computing entity 1600 may include or be in communication with one or more processing unit 1610 (also referred to as processors, processing circuitry, processing element, and/or similar terms used herein interchangeably) that communicate with other elements within the management computing entity 1600. As will be understood, processing unit 1610 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1610 may be configured for a particular use or configured to execute instructions stored in volatile or non-volatile media 1630 and 1640. As such, whether configured by hardware or computer program products, or by a combination thereof, processing unit 1610 may be capable of performing steps or operations according to embodiments of the present disclosure when configured accordingly.

Although not shown explicitly, management computing entity 1600 may include or be in communication with one or more input elements, such as a keyboard, a mouse, a touch screen/display, a camera for motion and movement input, a mic for audio input, a joystick, and/or the like. Management computing entity 1600 may also include or be in communication with one or more output elements such as speaker, screen/display, and/or the like.

In various embodiments, one or more of the components of management computing entity 1600, or portions of one or more of such components, may be located remotely from other management computing entity components, such as in a distributed system or in the cloud. Furthermore, one or more of the components may be combined and additional components performing functions described herein may be included in the management computing entity 1600.

Artificial Neural Network for Product Matching

As described herein, embodiments of the present invention use one or more deep learning networks to compare product attribute data and determine matches among products. Various exemplary deep learning algorithms are within the scope of the present invention. As an example, the following description of FIG. 17 describes in detail illustrative machine learning (ML) techniques for training of machine learning methods and models, including but not limited to, parametric classification methods, non-parametric methods, decision tree learning, neural networks, methods combining both inductive and analytic learning, and regression models.

Figure 17:
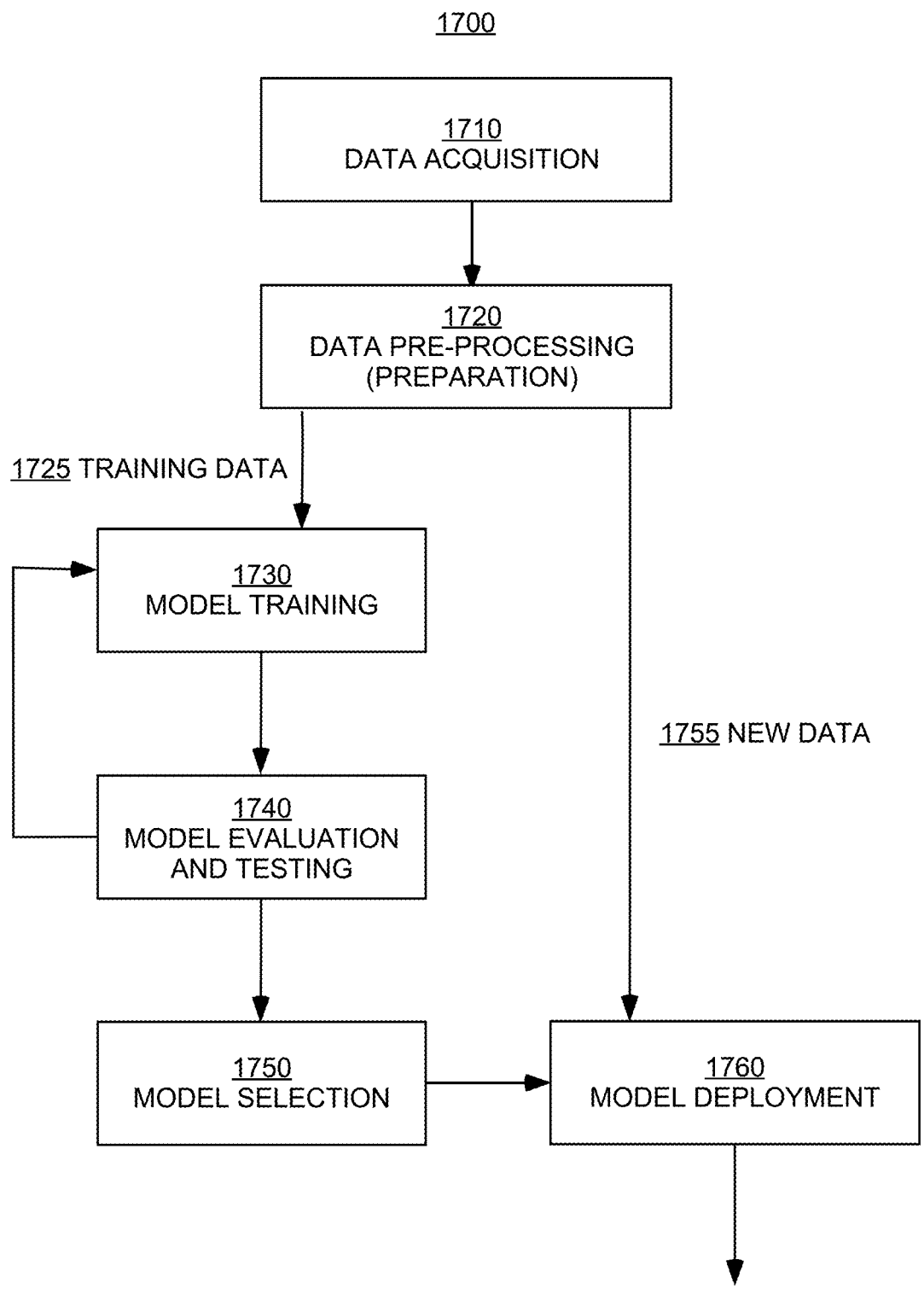
FIG. 17 is an illustrative flow diagram for training a machine learning algorithm, according to exemplary embodiments of the present invention.

More specifically, FIG. 17 is an illustrative flow diagram 1700 for training a machine learning algorithm such as a deep learning neural network, according to exemplary embodiments of the present invention. Neural networks are computer systems inspired by the human brain. They are parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. There are also may different types of neural networks. Examples include, but are not limited to, feed forward networks, convolutional neural networks, recurrent neural networks, and Siamese neural networks. Convolutional Neural Networks utilize the process of convolution to reduce the number of model parameters involved, while successfully capturing spatial and/or temporal dependencies in the input data. Siamese neural networks use the same weights on two different inputs to compute comparable outputs, with one output often precomputed to serve as a reference or baseline against which the other output is compared to.

The training process of a deep learning network begins at step 1710 with data acquisition, retrieval, assimilation, or generation. At step 1720, acquired data are pre-processed, or prepared. At step 1730, the ML model is trained using training data 1725. At step 1740, the ML model is evaluated, validated, and tested, and further refinements to the ML model are fed back into step 1730 for additional training. Once its performance is acceptable, at step 1750, optimal model parameters are selected, for deployment at step 1760. New data 1755 may be used by the deployed model to generate signatures for product matching.

Training data 1725 typically consist of pairs of an input and a corresponding ground truth output, also known as a target or a label. The ML model is run at step 1730 with the input to produce a result, which is in turn compared with the ground truth output at step 1740, for example, in terms of a loss function. Based on the result of the comparison, parameters of the ML model, such as weights in a neural network may be adjusted. In the PRICE system, training data 1725 may be a documented, labeled dataset containing multiple instances of system inputs (e.g., reference and candidate product pairs) and correct outcomes (e.g., match probabilities or match decisions). It trains the ML model to optimize the product matching performance. In some embodiments, training data 1725 may also include subsets for validating and testing the ML model. For an NN-based ML model, the quality of the output may depend on (a) NN topology design and hyperparameter configurations, (b) NN coefficient or parameter optimization, and (c) quality of the training data set. These components may be refined and optimized using various methods. For example, training data 1725 may be expanded via an augmentation process.

As illustrated by FIGS. 7 to 11, each data analyzer in FIG. 6 may comprise one or more deep-learning neural networks that require training. In some embodiments, each analyzer may be trained separately first, for example, by using a triple loss function on the Siamese signature outputs. Aggregator 660 may then be trained on output data from the analyzers. That is, the NNs in the data analyzers may be frozen while the entire matching model 600 is trained on input product attribute data and corresponding ground truth match result, or appropriately defined match probabilities or similarity scores. In some other embodiments, training of individual data analyzers may be carried out as part of the training process of the overall product matching module 600 instead.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device, as illustrated in FIG. 3, is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for generating a list of matching products, wherein each matching product matches a reference product, comprising:
   receiving a user query for the reference product;
   determining reference attribute data for the reference product, wherein the reference attribute data is multimodal having at least a first data mode and a second data mode different from the first data mode, wherein each data mode is a type of characterization of the reference product, and wherein each data mode has a modality selected from the group consisting of a text data class, categorical data, a pre-compared engineered feature, audio data, image data, and video data;
   determining a first list of candidate products, based on at least one reference product match signature generated from the reference attribute data by a deep learning product signature model;
   generating a second list of candidate products from the first list of candidate products, wherein at least one given candidate product in the first list of candidate products has multimodal attribute data with at least the first data mode and the second data mode, and wherein for the given candidate product,
      selecting a deep learning multimodal matching model from a plurality of candidate multimodal matching models, based on a reference category associated with the reference product and a first attribute data item for the given candidate product, wherein each candidate multimodal matching model has been previously trained on a category-specific training dataset, wherein the selected deep learning multimodal matching model comprises at least a first data analyzer for processing data having the first data mode and a second data analyzer for processing data having the second data mode, wherein the first data analyzer comprises a first deep learning neural network (DLNN), and wherein the second data analyzer comprises a second DLNN,
      matching the given candidate product to the reference product using the selected deep learning multimodal matching model to generate a match score, wherein the match score is computed based on the reference attribute data for the reference product and attribute data for the given candidate product,
      determining whether the match score meets a given threshold, and
      in response to determining that the match score meets the given threshold, adding the given candidate product to the second list of candidate products; and
   generating the list of matching products by filtering the second list of candidate products to remove outlier candidate products.

2. The method of claim 1, wherein the first attribute data item for the given candidate product is selected from the group consisting of product type, vendor, brand, product category, and target consumer group.

3. The method of claim 2, wherein the first attribute data item is a product type attribute having a value selected from the group consisting of new, used, refurbished, renewed, open-box, generic, rental, offline sale, local resale, and auction.

4. The method of claim 1, wherein the selecting of the deep learning multimodal matching model is further based on a user attribute extracted from the user query.

5. The method of claim 4, wherein the user attribute is selected from the group consisting of a location, a gender, and an age.

6. The method of claim 1, wherein the user query comprises at least one reference attribute data item for the reference product, the at least one reference attribute data item selected from the group consisting of a search keyword, an image, an audio clip, a video clip, a web address, a barcode, a stock keeping unit (SKU) code, a Universal Product Code (UPC), an International Standard Book Number (ISBN), an Amazon Standard Identification Number (ASIN), an European Article Number (EAN) and a Manufacturer's Part Number (MPN).

7. The method of claim 1, wherein the determining the reference attribute data for the reference product comprises:
   extracting at least one identifier for the reference product from the user query;
   determining whether the reference product exists in an internal database by searching the internal database with the at least one identifier for the reference product;
   in response to determining that the reference product exists in the internal database, retrieving the reference attribute data for the reference product from the internal database; and
   in response to determining that the reference product does not exist in the internal database, performing a search in at least one external database for the reference product to identify the reference attribute data for the reference product, and adding the reference product to the internal database by adding the reference attribute data to the internal database.

8. The method of claim 1, wherein the text data class is selected from the group consisting of a title text class, a product description text class, a product review text class, a social media post text class, and a ranking label text class.

9. The method of claim 1,
   wherein the reference attribute data comprises at least a first reference subset of attribute data having the first data mode and a second reference subset of attribute data having the second data mode,
   wherein the attribute data for the given candidate product comprises at least a first comparison subset of attribute data having the first data mode, and a second comparison subset of attribute data having the second data mode, and
   wherein the matching the given candidate product to the reference product using the selected deep learning multimodal matching model to generate the match score comprises:
      determining, for the reference product, a first reference signature from the first reference subset of attribute data using the first DLNN in the first data analyzer, and a second reference signature from the second reference subset of attribute data using the second DLNN in the second data analyzer; and determining, for the given candidate product, a first comparison signature from the first comparison subset of attribute data using the first DLNN in the first data analyzer, and a second comparison signature from the second comparison subset of attribute data using the second DLNN in the second data analyzer, wherein the match score is computed based on the first reference signature, the second reference signature, the first comparison signature, and the second comparison signature.

10. The method of claim 1, wherein at least one candidate product in the first list of candidate products has a second engineered feature attribute data item that has been pre-compared to the reference product.

11. The method of claim 1, wherein the match score is a matching probability.

12. The method of claim 1, wherein the filtering the second list of candidate products comprises:
clustering candidate products in the second list of candidate products based on at least a second attribute data item;
determining whether an outlier cluster comprising the outlier candidate products exists; and
in response to determining that the outlier cluster exists, removing the outlier candidate products in the outlier cluster from the second list of candidate products.

13. The method of claim 12, wherein the second attribute data item is a price attribute.

14. The method of claim 1, further comprising:
receiving a user selection of one target product in the list of matching products; and
providing to the user a link to an online purchase page for the target product.

15. The method of claim 1, wherein the reference product match signature is generated from at least one reference attribute data item selected from the group consisting of a keyword, an image, and a categorical variable associated with the reference product.

16. The method of claim 15, wherein the reference product match signature is generated further from the user query.

17. A system for generating a list of matching products, wherein each matching product matches a reference product, comprising:
one or more processors; and
one or more non-transitory, computer-readable storage media for storing program code accessible by the one or more processors, the program code when executed by the one or more processors causes the one or more processors to:
receive a user query for the reference product;
determine reference attribute data for the reference product, wherein the reference attribute data is multimodal having at least a first data mode and a second data mode different from the first data mode, wherein each data mode is a type of characterization of the reference product, and wherein each data mode has a modality selected from the group consisting of a text data class, categorical data, a pre-compared engineered feature, audio data, image data, and video data;
determine a first list of candidate products, based on at least one reference product match signature generated from the reference attribute data by a deep learning product signature model;
generate a second list of candidate products from the first list of candidate products, wherein at least one given candidate product in the first list of candidate products has multimodal attribute data with at least the first data mode and the second data mode, and wherein for the given candidate product,
select a deep learning multimodal matching model from a plurality of candidate multimodal matching models, based on a reference category associated with the reference product and a first attribute data item for the given candidate product, wherein each candidate multimodal matching model has been previously trained on a category-specific training dataset, wherein the selected deep learning multimodal matching model comprises at least a first data analyzer for processing data having the first data mode and a second data analyzer for processing data having the second data mode wherein the first data analyzer comprises a first deep learning neural network (DLNN), and wherein the second data analyzer comprises a second DLNN,
match the given candidate product to the reference product using the selected deep learning multimodal matching model to generate a match score, wherein the match score is computed based on the reference attribute data for the reference product and attribute data for the given candidate product,
determine whether the match score meets a given threshold, and
in response to determining that the match score meets the given threshold, add the given candidate product to the second list of candidate products; and
generate the list of matching products by filtering the second list of candidate products to remove outlier candidate products.

18. The system of claim 17, wherein the first attribute data item for the given candidate product is selected from the group consisting of product type, vendor, brand, product category, and target consumer group.

19. A non-transitory, computer-readable storage medium for generating a list of matching products, wherein each matching product matches a reference product, the non-transitory, computer-readable storage medium storing program code accessible by one or more processors, the program code when executed by the one or more processors causes the one or more processors to:
receive a user query for the reference product;
determine reference attribute data for the reference product, wherein the reference attribute data is multimodal having at least a first data mode and a second data mode different from the first data mode, wherein each data mode is a type of characterization of the reference product, and wherein each data mode has a modality selected from the group consisting of a text data class, categorical data, a pre-compared engineered feature, audio data, image data, and video data;
determine a first list of candidate products, based on at least one reference product match signature generated from the reference attribute data by a deep learning product signature model;
generate a second list of candidate products from the first list of candidate products, wherein at least one given candidate product in the first list of candidate products has multimodal attribute data with at least the first data mode and the second data mode, and wherein for the given candidate product, select a deep learning multimodal matching model from a plurality of candidate multimodal matching models, based on a reference category associated with the reference product and a first attribute data item for the given candidate product, wherein each candidate multimodal matching model has been previously trained on a category-specific training dataset, wherein the selected deep learning multimodal matching model comprises at least a first data analyzer for processing data having the first data mode and a second data analyzer for processing data having the second data mode, wherein the first data analyzer comprises a first deep learning neural network (DLNN), and wherein the second data analyzer comprises a second DLNN, match the given candidate product to the reference product using the selected deep learning multimodal matching model to generate a match score, wherein the match score is computed based on the reference attribute data for the reference product and attribute data for the given candidate product, determine whether the match score meets a given threshold, and in response to determining that the match score meets the given threshold, add the given candidate product to the second list of candidate products; and generate the list of matching products by filtering the second list of candidate products to remove outlier candidate products.

20. The non-transitory, computer-readable storage medium of claim 19, wherein the first attribute data item for the given candidate product is selected from the group consisting of product type, vendor, brand, product category, and target consumer group.

* * * * *